(12) United States Patent
Lee et al.

(10) Patent No.: US 7,121,671 B2
(45) Date of Patent: Oct. 17, 2006

(54) PHASE-COMPENSATED CUBE CORNER IN LASER INTERFEROMETRY

(75) Inventors: Lawrence Hakchu Lee, San Jose, CA (US); John J. Bockman, Santa Clara, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 118 days.

(21) Appl. No.: 10/734,990

(22) Filed: Dec. 11, 2003

(65) Prior Publication Data
US 2005/0128589 A1 Jun. 16, 2005

(51) Int. Cl.
*G02B 5/122* (2006.01)
(52) U.S. Cl. .................... 359/529; 359/485
(58) Field of Classification Search ........ 359/529, 359/485
See application file for complete search history.

(56) References Cited

U.S. PATENT DOCUMENTS

| | | | |
|---|---|---|---|
| 3,563,633 A * | 2/1971 | Mauer | 359/496 |
| 4,189,205 A | 2/1980 | Vandehei | |
| 4,312,570 A | 1/1982 | Southwell | |
| 6,198,574 B1 | 3/2001 | Hill | |
| 6,201,609 B1 | 3/2001 | Hill et al. | |
| 6,704,144 B1 * | 3/2004 | Huang | 359/634 |

OTHER PUBLICATIONS

"Laser and Optics", Agilent Technologies, User's Manual, pp. 7A-2 to 7C-21, 7G-2 to 7H-14.

Philip Baumeister, "Optical Coating Technology", a book used at a five day short course, University of California at Los Angles University Extension, Department of Engineering, Information Systems and Technical Management, Jan. 12, 1998 t- Jan. 16, 1998, 15 pages.

Paul Mauer, "Phase Compensation of Total Internal Reflection", Journal of the Optical Society of America, vol. 56, No. 9, Sep. 1966, pp. 1219-1221.

Paul B. Mauer, "Modification of Phase-Compensated Corner Cube for Interferometry", Letters to the Editor, vol. 57, p. 968.

P. B. Kard, "On Elimiantion of the Doublet Structure of the Transmission Band in a Total-Reflection Light-Filter", Optics and Spectroscopy, vol. VI, No. 3, Mar. 1959, pp. 244-246.

P. G. Kard, "On the Influence of Thin Films on Total Reflection", Optics and Spectroscopy, vol. VI, No. 4, Apr. 1959, pp. 339-341.

W. H. Steel, "Polarization-preserving reroreflectors", Applied Optics, vol. 24, No. 21, Nov. 1, 1985, pp. 3433-3434.

* cited by examiner

*Primary Examiner*—Euncha P. Cherry

(57) ABSTRACT

A phase-compensating cube corner retroreflector includes three rear reflecting surfaces. The first and the third rear reflecting surfaces can be coated with a phase-compensating film stack that induces $2n\pi$ phase difference upon reflection, where n is an integer including 0. Alternatively, all three rear reflecting surfaces can be coated with a phase-compensating film stack that induces $n\pi$ phase difference when handling linearly polarized light, or $2n\pi$ phase difference when handling linearly or circularly polarized light. So coated, the phase-compensating cube corner preserves the polarization orientation and ellipticity of the incident light. Such a phase-compensating cube corner can be used to improve the accuracy of distance-measuring interferometers. The cube corner directs light to and from other optical elements, including a polarizing beam-splitters, mirrors, and quarter-wave plates.

30 Claims, 13 Drawing Sheets

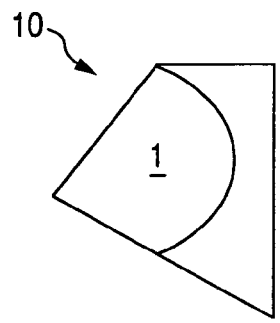
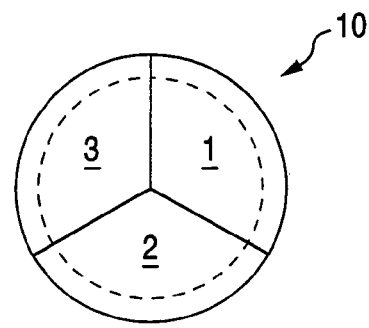
FIG. 1A
(PRIOR ART)
FIG. 1B
(PRIOR ART)
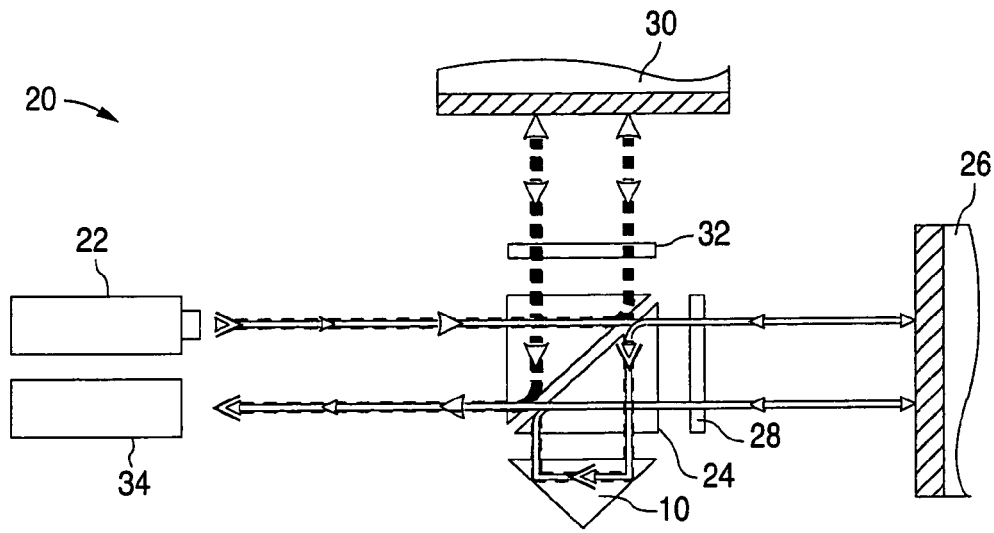
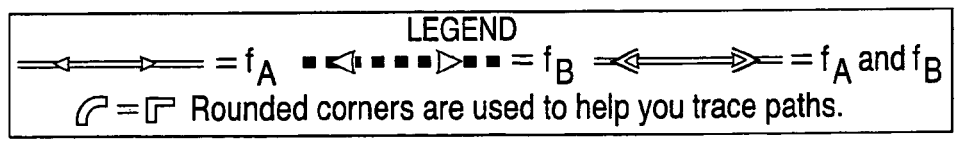
FIG. 2
(PRIOR ART)

Face 1 Coordinate Frame

Face 1 Coordinate Frame

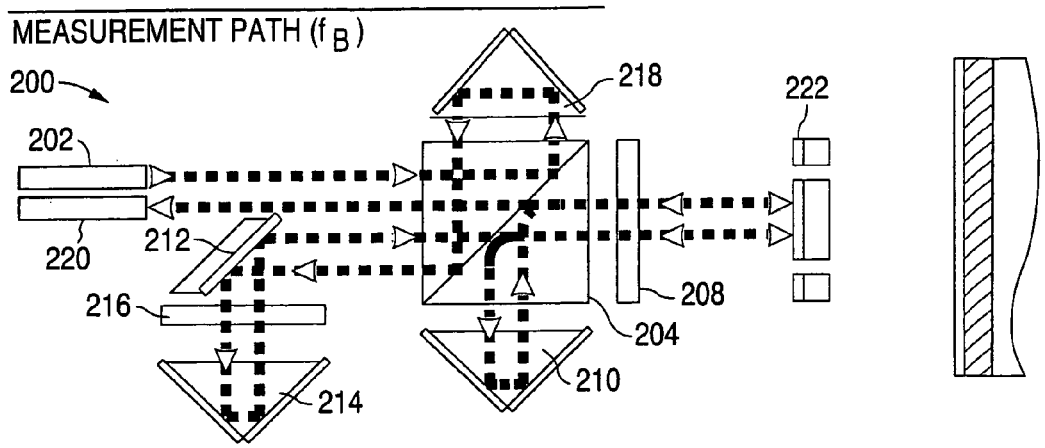
FIG. 18B
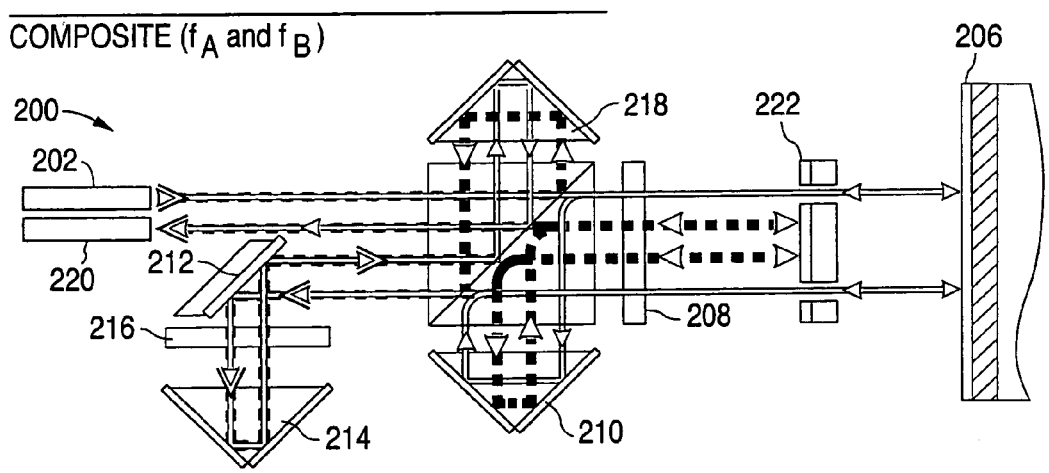
FIG. 18C
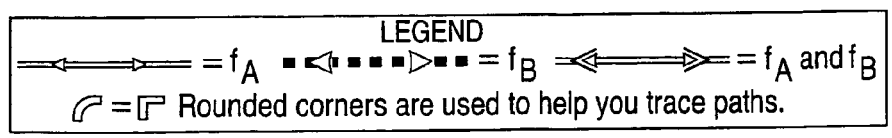

100 # PHASE-COMPENSATED CUBE CORNER IN LASER INTERFEROMETRY

DESCRIPTION OF RELATED ART

The conventional cube corner (CC) retroreflector has the property that any ray entering the effective aperture will be reflected and emerge from the entrance/exit face parallel to itself, but with opposite direction of propagation. This property is, within acceptance angle limits, independent of the orientation of the retroreflector. Retroreflectors therefore find frequent application in situations where angular orientation is difficult or impossible to control and where a mirror would therefore be unsatisfactory. FIGS. 1A and 1B illustrate a side and a front view of a conventional CC retroreflector 10.

Some conventional CC retroreflectors use the principle of total internal reflection (TIR) for its operation. The use of TIR limits the acceptable incident angles for the CC retroreflector. The use of TIR also changes the phase difference between the S and P components so the light exiting the CC retroreflector has a different polarization state, both in orientation and ellipticity, than the light entering the CC retroreflector. Experiments have shown that in solid BK-7 CC retroreflectors using TIR (without any coating), incident linearly polarized light will exhibit about 8.4 degrees of relative rotation of azimuth angle and about 11 degrees of ellipticity. Azimuth is defined as the angle between the major axis of the polarization ellipse to horizontal or vertical reference axes, and tangent of ellipticity is defined as the ratio of minor to major axes of the polarization ellipse.

The limitation on the incident angle can be removed, at the cost of a reduction in reflective efficiency, by applying a reflective coating to the rear reflecting surfaces (e.g., faces 1, 2, and 3). Thus, some conventional CC retroreflectors have their rear reflecting surfaces coated with silver and then with paint to prevent oxidation of the silver. Nonetheless, the use of the reflecting coating still causes the light exiting the CC retroreflector to have a different polarization state than the light entering the CC retroreflector. Experiments have shown that in solid BK-7 CC retroreflectors with silver coated rear reflecting surfaces, incident linearly polarized light will exhibit about 6.0 degrees of relative rotation of azimuth angle and about 1.0 degree of ellipticity. The paint used to coat the silver is also known to outgas in certain environments and contaminate the surrounding components.

FIG. 2 illustrates a conventional plane mirror interferometer system 20. A laser head 22 generates a coherent, collimated light beam consisting of two orthogonally polarized frequency components. One frequency component $f_A$ (e.g., a measurement beam having a P-polarization) enters the interferometer's measurement path while the other frequency component $f_B$ (e.g., a reference beam having an S-polarization) enters the interferometer's reference path.

In the measurement path, a polarizing beam-splitter 24 transmits frequency component $f_A$ to a measurement plane mirror 26 mounted to a moving stage. Since frequency component $f_A$ passes through a quarter-wave plate 28, the returning polarization is rotated 90 degrees and the newly S-polarized frequency component $f_A$ is reflected by polarizing beam-splitter 24 to CC retroreflector 10. Retroreflector 10 directs frequency component $f_A$ again to polarizing beam-splitter 24, which again reflects frequency component $f_A$ to measurement mirror 26. Again, since frequency component $f_A$ passes through quarter-wave plate 28, the returning polarization is rotated 90 degrees and the newly P-polarized frequency component $f_A$ is transmitted through polarizing beam-splitter 24 onto a receiver 34.

In the reference path, polarizing beam-splitter 24 reflects frequency component $f_B$ to a reference plane mirror 30. Since frequency component $f_B$ passes through a quarter-wave plate 32, the returning polarization is rotated 90 degrees and the newly P-polarized frequency component $f_B$ is transmitted through polarizing beam-splitter 24 to CC retroreflector 10. CC retroreflector 10 directs frequency component $f_B$ through beam-splitter 24 to reference mirror 30. Again, since frequency component $f_B$ passes through quarter-wave plate 32, the returning polarization is rotated 90 degrees and the newly S-polarized frequency component $f_B$ is reflected by polarizing beam-splitter 24 coaxially with frequency component $f_A$ onto receiver 34.

The importance of maintaining the polarization states through CC retroreflector 10 can be seen in FIG. 2. If CC retroreflector 10 changes the orientations of frequency components $f_A$ and $f_B$, then parts of frequency components $f_A$ and $f_B$ would leak through polarizing beam-splitter 24, which can cause a decrease in the accuracy of the distance measurements.

A paper by Paul Mauer discloses that a three-layer phase-compensating film stack can be formed on the rear reflecting surfaces of a CC retroreflector to compensate the phase shift due to TIR. "Phase Compensation of Internal Reflection" by Paul Mauer, J. Opt. Soc. Am. 56, 1219 (1966). However, the paper states that although the ellipticity of the light is preserved, the orientation of the light is changed. "Although a coating of this type compensates phase shift on total internal reflection, there remains, in general, a rotation of the plane of polarization when light is returned from a phase-compensated corner cube." Id. at 1221. Reading this paper, one skilled in the art would be discouraged from using the phase-compensated cube corner in an interferometer system because the paper states that the polarization orientation is changed by the phase-compensated cube corner. As described above, change in the polarization orientation is known to decrease the accuracy of the interferometry system.

In a series of lecture notes for a UCLA Extension class, Philip Baumeister cites the Mauer paper for describing the use of a three-layer film stack to reduce the differential phase shift upon reflection. "Optical Coating Technologies" by Philip Baumeister, UCLA Extension (1998). In FIGS. 1–122 of these lecture notes, Baumeister shows a differential phase shift of approximately 0 degree for a normal angle of incidence when the three-layer film stack is applied to the three rear reflecting surfaces of the cube corner. Reading this paper, one skilled in the art would also read the Mauer paper described above. Thus, for the same reasons described above, one skilled in the art would be discouraged from using the phase-compensated cube corner in an interferometer system because the Mauer paper states that the polarization orientation is changed by the phase-compensated cube corner.

Thus, what is needed is a CC retroreflector that addresses the relative polarization rotation, ellipticity, reflective efficiency, and contamination problems of a conventional CC retroreflector.

SUMMARY

In one embodiment of the invention, a phase-compensating cube corner retroreflector includes three rear reflecting surfaces. The first and the third rear reflecting surfaces can be coated with a phase-compensating film stack that induces 2nπ phase difference upon reflection, where n is an integer including 0. Alternatively, all three rear reflecting surfaces can be coated with a phase-compensating film stack that induces nπ phase difference when handling linearly polarized light, or 2nπ phase difference when handling linearly or circularly polarized light. So coated, the phase-compensating cube corner preserves the polarization orientation and ellipticity of the incident light.

In one embodiment, an interferometer system includes a phase-compensating cube corner. The phase-compensating cube corner directs light to and from other optical elements, including polarizing beam-splitters, mirrors, and quarter-wave plates.

BRIEF DESCRIPTION OF THE DRAWINGS

FIGS. 1A and 1B illustrate a side and a front view of a conventional cube corner retroreflector.

FIG. 2 illustrates a conventional plane mirror interferometer system.

FIGS. 13 to 16A illustrate the derivation of the polarization orientation and ellipticity with a phase-compensated cube corner having 180 degree phase difference in one embodiment of the invention.

FIGS. 18A, 18B, and 18C illustrate a differential interferometer system in one embodiment of the invention.

DETAILED DESCRIPTION

In one embodiment of the invention, a dielectric multi-layer thin film coating is deposited on all reflecting surfaces or only the first and the third reflecting surfaces of a solid BK-7 cube corner. The thin film stack is designed specifically to preserve upon reflection the azimuth and ellipticity angles of the incident polarization. The thin film coating reduces polarization rotation from about 6 degrees (for silver coated cube corner) to about 0.5 degree, and ellipticity from about 1.0 degree to about 0.5 degree for a linearly polarization state. Additionally, since all reflections are accomplished with total internal reflection (TIR), the net irradiance efficiency is near 100%. Furthermore, problems associated with outgassing are alleviated because the rear reflecting surfaces of the cube corner do not need to be painted as the dielectric materials are inert.

Introduction

Reflection processes in general induce change to the polarization state of light. Polarization states change on reflection as electric field components undergo relative phase retardation and/or coordinate transformation. The extent of the change depends on the incident angle and the polarization as well as on the optical properties of the surface.

To be described herein, the polarization effects associated with total internal reflections (TIR) in solid cube corners are considered. Using Stokes parameter representation, a numerical model is created to make predictions and develop ways to preserve ellipticity and azimuth angle of the initial polarization.

Uncoated TIR Cube Corner

Figure 3:
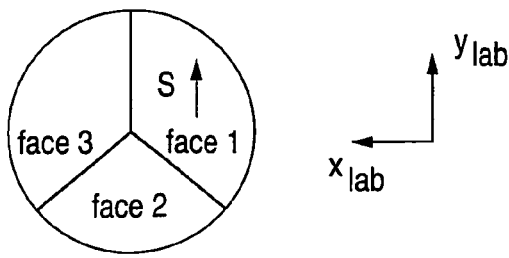
FIGS. 3 to 8 illustrate the derivation of the polarization orientation and ellipticity with an uncoated conventional cube corner in one embodiment of the invention.
Figure 4:
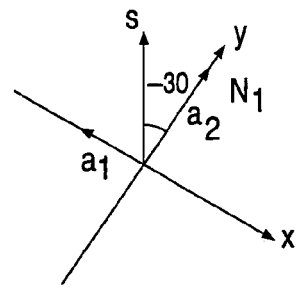

For an uncoated cube corner, each reflection is TIR with a phase retardation $\Delta$ of 45.2 degrees between the S and the P polarization states. For an incident S-polarized beam propagating in negative z direction into face 1 with a face folded edge perpendicular to the horizontal plane as shown in FIG. 3, the beam undergoes three reflections and finally emerges from face 3 propagating in the positive z direction. For the first reflection on face 1, the unit normal vector for the plane of incidence is given by:

$$N_1 = 0.500i + 0.866j + 0.000k, \quad (0.1)$$

where i, j and k are unit vectors in the laboratory Cartesian frame of FIG. 3. In a Cartesian coordinate frame defined by $N_1$, the S-polarization makes an angle of −30 degrees with the y-axis of this frame as shown in FIG. 4. The azimuth angle is negative since it is measured counterclockwise from the y-axis. In this rotated frame, the y-axis is perpendicular while the x- and z-axes lie in the plane of incidence of face 1. The incident unit magnitude polarization vector in this frame is represented by its components $a_1$ and $a_2$. The values for components $a_1$ and $a_2$ are:

$$a_1 = -0.500 \quad (1)$$

$$a_2 = 0.866. \quad (2)$$

With these values of components $a_1$, $a_2$ and the azimuth $\psi$ ($=\psi_0$)=−30 degrees in face 1 coordinate frame and looking into the beam as shown in FIG. 4, it is possible to use equation II.12 of Appendix II to calculate the phase difference $\delta$ between components $a_1$ and $a_2$ of the input beam as follows:

$$(a_1^2 - a_2^2)\tan 2\psi = 2a_1 a_2 \cos \delta. \quad (II.12)$$

Henceforth, all references to coordinate frames are from the view of looking into a beam. It is important that in equation II.12 the azimuth angle $\psi$ is measured from the y-axis. This is only true when $|a_2| > |a_1|$. Solving for the phase difference $\delta$, it is determined that:

$$\delta = \delta_0 = 180 \text{ deg.} \quad (2.1)$$

This value for phase difference $\delta_0$ is then added to the relative phase retardation $\Delta$, which is 45.2 degrees for uncoated TIR reflection at 54.7 degrees of incidence, to enable the calculation of ellipticity $\chi_1$ and azimuth angle $\psi_1$ of the reflected beam from face 1 as follows:

$$\delta_1 = \Delta + \delta_0 = 225.2 \text{ deg.} \quad (2.2)$$

$$\tan \alpha_1 a_2/a_1 = -1.732. \quad (2.3)$$

Phase difference $\delta_1$ is post reflection relative phase retardation between components $a_1$ and $a_2$. Additionally due to the reflection being TIR, $\tan \alpha_1 = \tan \alpha_0$. The calculation for azimuth angle $\psi_1$ proceeds with the reapplication of equation II.12 using the above value for phase difference $\delta_1$ as follows:

$$\tan 2\psi_1 = 2 \tan \alpha_1 \cos \delta_1/(1-\tan^2 \alpha_1)$$

$$\psi_1 = -25.3 \text{ deg.} \quad (3)$$

Next using the Stokes parameter $S_3$ of equation III.15 in Appendix III, the ellipticity $\chi_1$ is calculated as follows:

$$S_3 = \sin 2\chi = \{2 \tan \alpha/(1+\tan^2 \alpha)\} \sin \delta \quad (4)$$

$$\chi_1 = \sin^{-1} [\{2 \tan \alpha_1/(1+\tan 2\alpha_1)\} \sin \delta_1]/2 \quad (5)$$

$$\chi_1 = 18.96 \text{ deg.}$$

Figure 5:
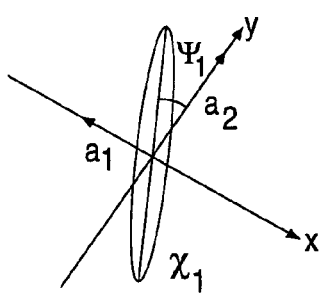

In equation 5, the tangent of ellipticity angle $\chi_1$ is the ratio of the minor to the major axis of the elliptical polarization. See equation III.0.b in Appendix III. FIG. 5 illustrates the reflected polarization state relative to the plane of incidence of face 1.

As was the case for the incident beam, the azimuth angle $\psi_1$ is negative with respect to the plane of incidence for face 1. The next step is to calculate azimuth angle $\psi_1$ relative to the plane of incidence of face 2 (ellipticity angle $\chi_1$ remaining unchanged with the rotation of coordinate frame). This is necessary since the reflected polarization from face 2 must be made relative to the plane of that face. To perform the coordinate transformation from face 1 to face 2, it is necessary to first know the unit normal vector for the plane of incidence of face 2. The unit normal vector for the plane of incidence of face 2 is:

$$N_2 = 0.000i + 0.577j + 0.816k. \quad (5.1)$$

Then taking the dot product of normal vectors $N_1$ and $N_2$, the angle $\phi_{12}$ between planes for faces 1 and 2 is given by:

$$\phi_{12} = 60 \text{ deg.} \quad (5.2)$$

Figure 6:
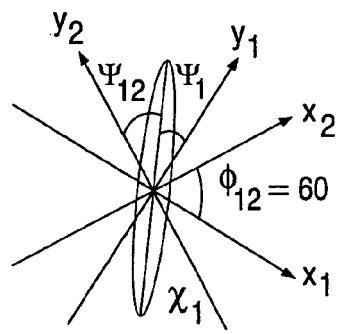

FIG. 6 illustrates the relative orientation of the two frames of reference where $y_1$, $x_1$ and $y_2$, $x_2$ are coordinate frames for faces 1 and 2 respectively. It is evident from FIG. 6 that the azimuth angle $\psi_{12}$ of the elliptically polarized state with respect to $y_2$ axis is given by, $$\psi_{12} = \psi_1 + 60 = 60 - 25.3 = 34.7 \text{ deg.} \quad (5.3)$$

The subscript 12 refers to the azimuth angle relative to frame 2 for the reflected beam from face 1. As shown in FIG. 6, the azimuth angle $\psi_{12}$ is a positive quantity (whereas azimuth angle $\psi_1$ was negative). Once azimuth angle $\psi_{12}$ and the ellipticity angle $\chi_1$ are determined for $y_2$, $x_2$ frame, the associated components $a_1$ and $a_2$ are also calculated. As described earlier with the input polarization for the first reflection, new values for components $a_1$, $a_2$ and phase difference $\delta_{12}$ are needed in advance of the second reflection. These quantities are determined from the Stokes parameter $S_1$ of equation III.13 from Appendix III and equation II.12 from Appendix II as follows:

$$S_1 = (1-\tan^2 \alpha)/(1+\tan^2 \alpha). \quad (6a)$$

Alternatively, these quantities are determined from the normalized form of equation III.10 from Appendix III as follows:

$$S_1 = \cos 2\chi \cos 2\psi. \quad (6b)$$

In equation 6b, the azimuth angle $\psi$ is always measured from the x-axis. Therefore, its value equal to:

$$\psi = 90 - \psi_{12}. \quad (6.1)$$

Solving equation 6a for $\tan \alpha$ and combining with equation 6b provide:

$$\tan \alpha_{12} = \{(1 - \cos 2\chi_1 \cos 2\psi)/(1 + \cos 2\chi_1 \cos 2\psi)\}^{1/2} \quad (7)$$
$$= 1.331.$$

From equation II.12:

$$\cos \delta_{12} = \{(1-\tan^2 \alpha_{12})/\tan \alpha_{12}\} \tan 2\psi_{12}/2 \quad (8)$$

$$\delta_{12} = 140.2 \text{ deg.}$$

As a result of measuring the azimuth from frame 2 (given by azimuth angle $\psi_{12}$), new values are assigned to $\tan \alpha$ and $\delta$ (see equations 7 and 8). So $\tan \alpha$ and $\delta$ are inherently dependent on the reference frame in which the azimuth angle $\psi$ is measured. For reflection 2 from uncoated face 2, the relative phase retardation $\Delta$ on $\tan \alpha_{12}$ (or equivalently on components $a_1$ and $a_2$) is once again 45.2 degrees. Then it follows that the phase difference $\delta_2$ is equal to:

$$\delta_2 = \Delta + \delta_{12} = 275 \text{ deg.} \quad (8.1)$$

Using calculation methods developed earlier for reflection 1, and applying equations 3 and 5 respectively for the azimuth angle $\psi_2$ and the ellipticity angle $\chi_2$, it is determined that:

$$\tan 2\psi_2 = 2 \tan \alpha_2 \cos \delta_2/(1-\tan^2 \alpha_2) \quad (8.2)$$

$$\psi_2 = 36.9 \text{ deg.} \quad (8.2)$$

$$\chi_2 = \sin^{-1}[\{2\tan\alpha_2/(1+\tan^2\alpha_2)\}\sin\delta_2]/2 \quad (8.3)$$
$$= -2.593 \text{ deg.}$$

Not that $\tan \alpha_2 = \tan \alpha_{12}$ for TIR reflection.

Figure 7:
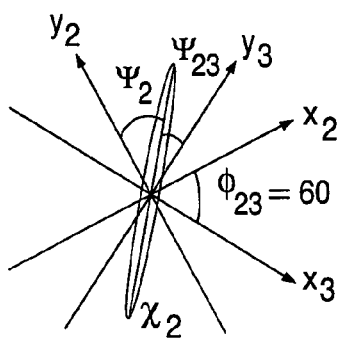

The azimuth angle $\psi 23$ with respect to face 3 is next found by noting that the $y_2$, $x_2$ and $y_3$, $x_3$ frames are relatively rotated by 60 degrees as shown in FIG. 7. This is determined from knowing that the unit normal vector for plane of incidence of face 3 is, $$N_3 = 0.500i + 0.866j + 0.000k. \quad (8.4)$$

Hence the dot product of normals $N_2$ and $N_3$ yields the angle between $x_2$- and $x_3$-axes to be 60 degrees. Additionally, $x_2$ and $x_3$ axes lie in the plane of incidence for faces 2 and 3 respectively, which is analogous to the fact that previously $x_1$ and $x_2$ axes were in the plane of incidences for faces 1 and 2. In this case, however, the azimuth angle $\psi_{23}$ is rotated counterclockwise from $y_3$ axis and is therefore a negative number calculated as follows:

$$\Psi_{23} = \psi_2 - 60 = -23.1 \text{ deg.} \quad (8.5)$$

Furthermore, $\tan \alpha_{23}$ is also negative and is calculated using equation 7 as follows:

$$\psi = 90 - \psi_{23} \quad (8.6)$$

$$\tan \alpha_{23} = \{(1-\cos 2\chi_2 \cos 2\psi)/(1+\cos 2\chi_2 \cos 2\psi)\}^{1/2} \quad (8.7)$$

$$\tan \alpha_{23} = -2.33$$

Using equation 8, $$\cos \delta_{23} = \{(1-\tan^2 \alpha_{23})/\tan \alpha_{23}\} \tan 2\psi_{23}/2 \quad (8.8)$$

$\delta_{23}$=172.9 deg.

For the reflection from face 3, tan $\alpha_{23}$ and $\delta_{23}$ from reflection 2 are utilized as inputs to determine the final ellipticity and azimuth angle. Using calculation methods outlined for reflection 1 and 2, it is determined that:

$$\delta_3 = \Delta + \delta_{23} \quad (8.9)$$
$$= 218.1 \text{ deg.,}$$

where $\Delta$=45.2 degrees and tan $\alpha_3$=tan $\alpha_{23}$. Then from equations 3 and 5, $$\tan 2\psi_3 = 2 \tan \alpha_3 \cos \delta_3/(1-\tan^2 \alpha_3) \quad (8.10)$$

$\psi_3$=−19.8 deg.

$$\chi_3 = \sin^{-1} [\{2 \tan \alpha_3/(1+\tan 2\alpha_3)\} \sin \delta_3]/2 \quad (8.11)$$

$\chi X_3$=13.3 deg.

Figure 8:
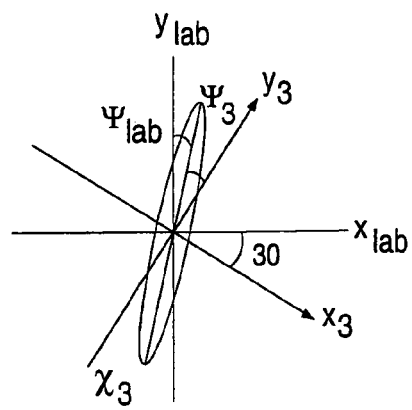

Then converting the azimuth angle to laboratory frame as shown in FIG. 8, $$\psi_{lab} = 30 + \psi_3. \quad (8.12)$$
$$= 10.2 \text{ deg.}$$

So after three TIR reflections, the initial polarization has transformed from its linear vertical state to one that has rotated 10.2 degrees and with ellipticity of 13.3 degrees. These computed values are in close agreement with experimental results:

TABLE 1

Predicted and measured azimuth and ellipticity angles

|  | Predicted (deg.) | Measured (deg.) |
|---|---|---|
| Azimuth | 10.2 | 8.4 |
| Ellipticity | 13.3 | 11.0 |

Similar calculation can also be made for P-polarized light.

Phase Compensated TIR Cube Corner

Reflection from a TIR cube corner with uncoated faces results in a transformation of the input polarization state from linear to an elliptical state. This is a consequence of non-zero phase retardation that occurs on an uncoated surface at the TIR angle of 54.7 degrees (the incident angle for each reflection in a cube corner). The idea of phase compensated coating is to introduce an interference coating stack on the TIR surface with certain phase thicknesses and refractive indices such as to reduce the reflected phase retardation from 45.2 to 0 or 180 degrees.

In order to produce optical interference within the coating stack, refractive indices for coating materials must be chosen in such a way that the internal transmitted angles be less than their respective critical angles. This way, the phase thicknesses for all layers in the stack will influence the net change in the reflected phase. With the aid of a thin film analysis program, various coating stacks are designed and investigated below.

Case I: Coating Phase Difference is Zero Degree (i.e., $\Delta$=180 Degrees)

In one embodiment, the thin film stack on the cube corner induces 0 degree phase difference for each of the three reflections that occur on a cube corner. The term phase difference follows the convention used in thin film calculation whereas phase retardation $\Delta$ follows the convention used in ellipsometry. The design is shown in Table 2:

TABLE 2

Zero degree phase difference

| Layer# | Material | Index (at 633 nm) | QWOT (nm) |
|---|---|---|---|
| 1 | SiO2 | 1.46 | 815 |
| 2 | TiO2 | 2.45 | 1066 |
| 3 | SiO2 | 1.46 | 1090 |
| 4 | TiO2 | 2.45 | 1702 |

Figure 9:
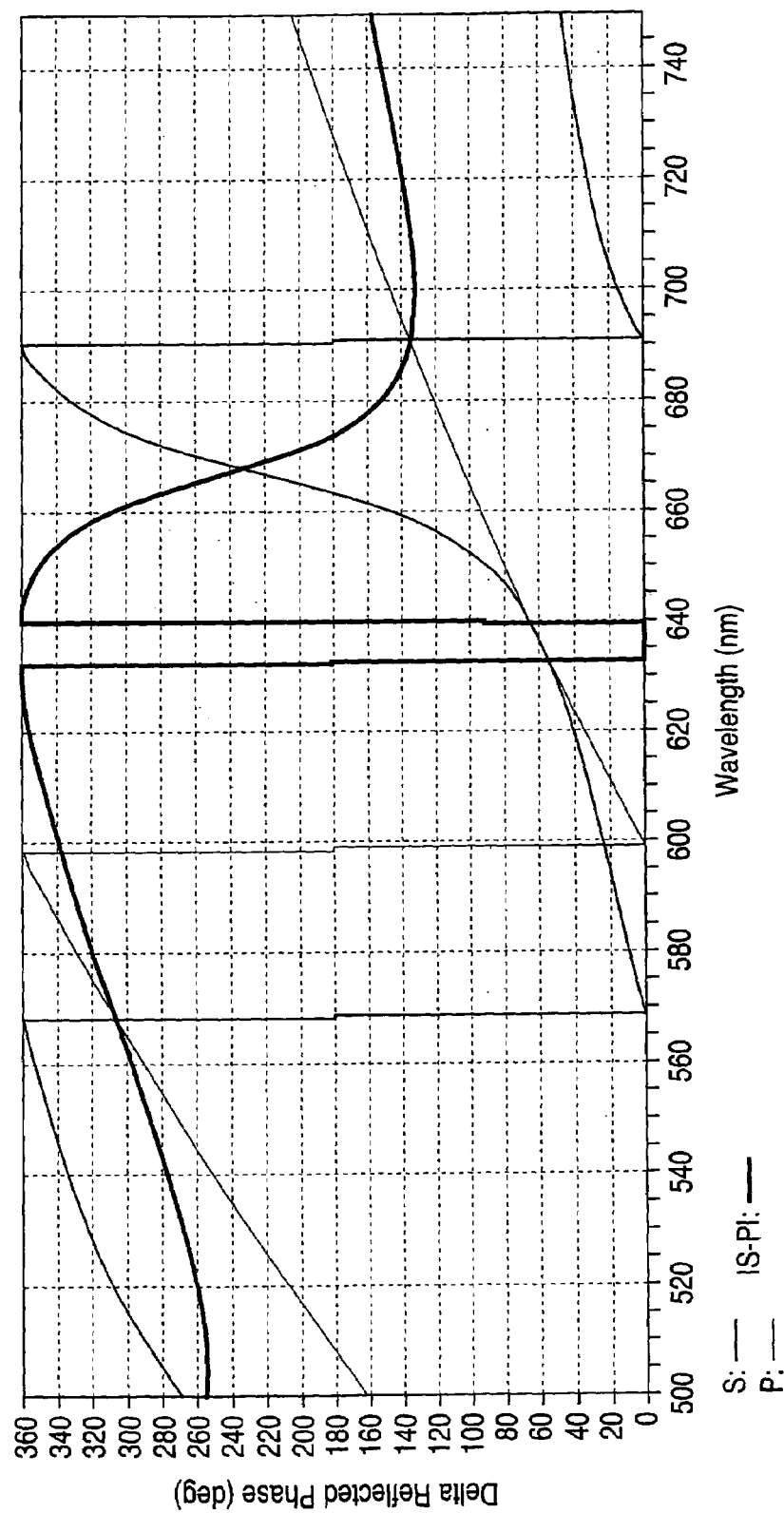
FIGS. 9 to 12 illustrate the derivation of the polarization orientation and ellipticity with a phase-compensated cube corner having 0 degree phase difference in one embodiment of the invention.

QWOT is an optical thickness equal to 4*N*T, where N is the refractive index and T is the physical thickness. Please note that the higher TiO2 index is achieved with ion-assist deposition process. Here layer 1 is the first layer on the BK-7 surface. FIG. 9 illustrates the phase change with the coating of Table 2.

This coating may now be incorporated in the polarization model developed for the analysis of the uncoated TIR cube corner to calculate the polarization state produced from a phase-compensated cube corner. Before continuing, however, it is important to resolve sign convention differences between thin film and polarization analysis. In the thin film convention, coatings that produce zero degree phase difference between the S and the P polarization states do not alter the sense of polarization. For example, incident right circular will remain right circular after reflection. However, the same phenomenon is described in polarization analysis as having flipped in the sense of polarization rotation from right to left circular. This happens because in polarization analysis the coordinate frame is always defined looking into the beam. Therefore, incident right circular polarization (looking into the beam) appears as left circular after reflection when viewing into the beam, even with zero degree reflected phase change. It thus appears, from the point of view of polarization analysis, that the coating induces exactly 180 degrees phase change on reflection between S and P and not zero degree as was predicted by the thin film convention. Even at normal incidence, polarization analysis predicts a change in the handedness of the polarization on reflection from right to left or visa versa, when physically there is no phase difference between S and P at normal incidence.

With this understanding, the TIR cube corner with the phase compensating coating of Table 2 is hereafter investigated.

Input Polarization

As in the earlier example of uncoated cube corner, the input state is S polarized with respect to laboratory frame. Thus, components a1, a2 and phase difference $\delta_0$ have the following values:

$$a_1 = -0.500 \quad (8.13)$$

$$a_2 = 0.866 \quad (8.14)$$

$$\delta_0 = 180. \quad (8.15)$$

Reflection 1

For reflection from face 1:

$$\Delta = 180 \text{ deg.} \tag{8.16}$$

$$\tan \alpha = -0.866/0.500 = -1.732. \tag{8.17}$$

$$\cos(\Delta+\delta_0) = \{(1-\tan^2 \alpha)/\tan \alpha\} \tan 2\psi_1/2 \tag{9}$$

$$\sin 2\chi_1 = \{2 \tan \alpha/(1+\tan^2 \alpha)\} \sin(\Delta+\delta_0) \tag{10}$$

Solving (9) for $\psi_1$ and (10) for $\chi_1$, $$\psi_1 = 30 \text{ deg.} \tag{10.1}$$

$$\chi_1 = 0 \text{ deg.} \tag{10.2}$$

Figure 10:
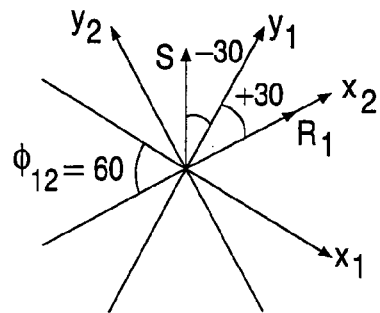

FIG. 10 shows the reflected polarization state $R_1$ from face 1. It is noteworthy in this instance that $R_1$ lies along the x-axis of frame 2. This important result will be utilized later in on embodiment where the phase compensation coating is only applied to two faces of the cube corner.

With respect to frame 2, $$\psi_{12} = \psi_1 + 60 = 90 \text{ deg.} \tag{10.3}$$

$$\psi = 90 - \psi_{12} \tag{10.4}$$

$$\tan \alpha_{12} = \{(1 - \cos2\chi_1\cos2\psi)/(1 + \cos2\chi_1\cos2\psi)\}^{1/2} \tag{11}$$
$$= 0$$

$$\cos \delta_{12} = \{(1-\tan^2 \alpha_{12})/\tan \alpha_{12}\} \tan 2\psi'_{12}/2 \tag{12}$$

$$\delta_{12} = 90.$$

Note that in equation 11, $\tan \alpha_{12}=0$ and this implies that $|a_2|<|a_1|$. Therefore, the azimuth angle $\psi'_{12}$ in equation 12 is measured with respect to the x-axis or in this case to the $x_2$-axis. The value for $\psi'_{12}$ is equal to, $$\psi'_{12} = 0 \text{ deg.} \tag{12.1}$$

Reflection 2

For reflection 2, no change is expected on ellipticity and azimuth angle since $R_1$ lies on the $x_2$-axis with no component of the polarization vector existing on the $y_2$-axis. This effect only holds true when the incident polarization to the cube corner (i.e., to face 1) is S or P polarized (with respect to laboratory frame). For any other polarization states, a vector component will exist along the $y_2$-axis.

$$\Delta = 180 \text{ deg.} \tag{12.2}$$

$$\tan \alpha = \tan \alpha_{12} = 0 \tag{12.3}$$

$$\cos(\Delta+\delta_{12}) = \{(1-\tan^2 \alpha)/\tan \alpha\} \tan 2\psi'_2/2 \tag{13}$$

$$\sin 2\chi_2 = \{2 \tan \alpha/(1+\tan^2 \alpha)\} \sin((\Delta+\delta_{12})) \tag{14}$$

Solving equation 13 for the azimuth angle $\psi'_2$ and equation 14 for the ellipticity angle $\chi_2$, $$\psi'_2 = 0 \text{ deg.} \tag{14.1}$$

$$\chi_2 = 0 \text{ deg.} \tag{14.2}$$

Again note that $\tan \alpha_{12}=0$. Therefore the azimuth $\psi'_2$ is measured with respect to $x_2$-axis.

Figure 11:
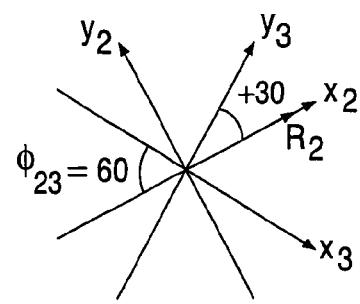
Figure 12:
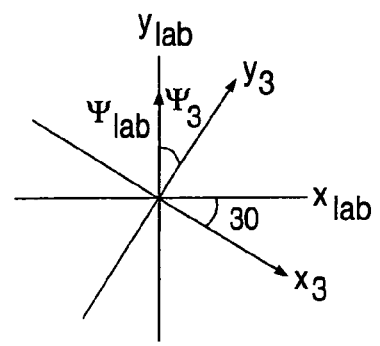

With respect to frame 3, the polarization vector $R_2$ forms an angle as shown in FIG. 11, $$\psi_{23} = \psi'_2 + 30 = 30 \text{ deg.} \tag{14.3}$$

In using the $S_1$ Stokes parameter in equations 6a and 6b, care must be taken by noting that the azimuth angle in these equations are measured from the x-axis. That is to say, $$\psi = 90 - \psi_{23} \tag{14.4}$$
$$= 60 \text{ deg.}$$

$$\tan\alpha_{23} = \{(1 - \cos2\chi_2\cos2\psi)/(1 + \cos2\chi_2\cos2\psi)\}^{1/2} \tag{14.5}$$
$$= 1.735$$

$$\cos \delta_{23} = \{(1-\tan^2 \alpha_{23})/\tan \alpha_{23}\} \tan 2\psi_{23}/2 \tag{14.6}$$

$$\delta_{23} = 180 \text{ deg.}$$

Reflection 3

For reflection 3, $$\Delta = 180 \text{ deg.} \tag{14.7}$$

$$\tan \alpha = \tan \alpha_{23} = 1.732. \tag{14.8}$$

$$\cos(\Delta+\delta_{23}) = \{(1-\tan^2 \alpha)/\tan \alpha\} \tan 2\psi_3/2 \tag{15}$$

$$\sin 2\chi_3 = \{2 \tan \alpha/(1+\tan^2 \alpha)\} \sin(\Delta+\delta_{23}) \tag{16}$$

Solving equation 15 for the azimuth angle $\psi_3$ and equation 16 for the ellipticity angle $\chi_3$, $$\psi_3 = -30 \text{ deg.} \tag{16.1}$$

$$\chi_3 = 0 \text{ deg.} \tag{16.2}$$

The azimuth angle relative to laboratory frame is given by, $$\psi_{lab} = 30 + \psi_3 \tag{16.3}$$
$$= 0 \text{ deg.}$$

With the azimuth angle $\psi_{lab}=0$ and ellipticity $\chi_3=0$, the cube corner with three TIR coatings preserves the state of linear and vertical input polarization.

Case II: Only Faces 1 and 3 are Coated.

In one embodiment, only faces 1 and 3 are coated with the coating of Table 2. If the same S-polarization is used as input, then the calculations of the ellipticity $\chi_1$ and azimuth angle $\psi_1$ up to reflection 2 will be the same as that of Case I. Therefore the Case I results for reflection 1 will be utilized here.

Reflection 2

As described in reflection 1 of Case I, the reflected polarization $R_1$ from face 1 lies in the plane of incidence of face 2 as shown in FIG. 10. Thus, regardless of the amount of phase change that occurs from face 2, the reflected state $R_2$ will always lie in that plane of incidence (i.e., there will be no change in its azimuth angle or ellipticity). Therefore, face 2 could have been left uncoated in Case I and the same end result would have been achieved. This result, however, is only valid for linear S or P input polarization states.

$$\Delta = 45.2 \text{ deg. (for uncoated surface)} \tag{16.4}$$

$$\delta_{12} = 90 \tag{16.5}$$

$$\tan\alpha = \tan\alpha_{12} = 0 \quad (16.6)$$

$$\cos(\Delta+\delta_{12}) = \{(1-\tan^2\alpha)/\tan\alpha\}\tan 2\psi'_2/2 \quad (17)$$

$$\sin 2\chi_2 = \{2\tan\alpha/(1+\tan^2\alpha)\}\sin((\Delta+\delta_{12})) \quad (18)$$

Solving equation 17 for the azimuth angle $\psi'_2$ and equation 18 for the ellipticity angle $\chi_2$, $$\psi'_2 = 0 \text{ deg.} \quad (18.1)$$

$$\chi_2 = 0 \text{ deg.} \quad (18.2)$$

With respect to frame 3 as shown in FIG. 11, the reflected state $R_2$ has $$\psi_{23} = \psi'_2 + 30 = 30 \text{ deg.} \quad (18.3)$$

Because these values for the azimuth angle $\psi'_2$, the ellipticity angle $\chi_2$, and the azimuth angle $\psi_{23}$ are identical to corresponding reflection 2 values from Case I, same results are also expected for reflection 3 of this case to that of Case I. From the point of view of vertical linear or horizontal linear input states, the two cases (both Case I and II) produce the same results. However, the same results cannot be produced for circularly polarized input states when only the first and the third faces are coated.

Case III: Coating Phase Difference is 180 Degrees (i.e., $\Delta$=0 Degree).

In one embodiment, the thin film stack on the cube corner induces 180 degrees phase difference on reflection. The coating design is shown in Table 3.

TABLE 3

| | 180 degree phase difference | | |
|---|---|---|---|
| Layer# | Material | Index (at 633 nm) | QWOT (nm) |
| 1 | TiO2 | 2.45 | 1316 |
| 2 | SiO2 | 1.46 | 1279 |
| 3 | TiO2 | 2.45 | 2595 |

Figure 13:
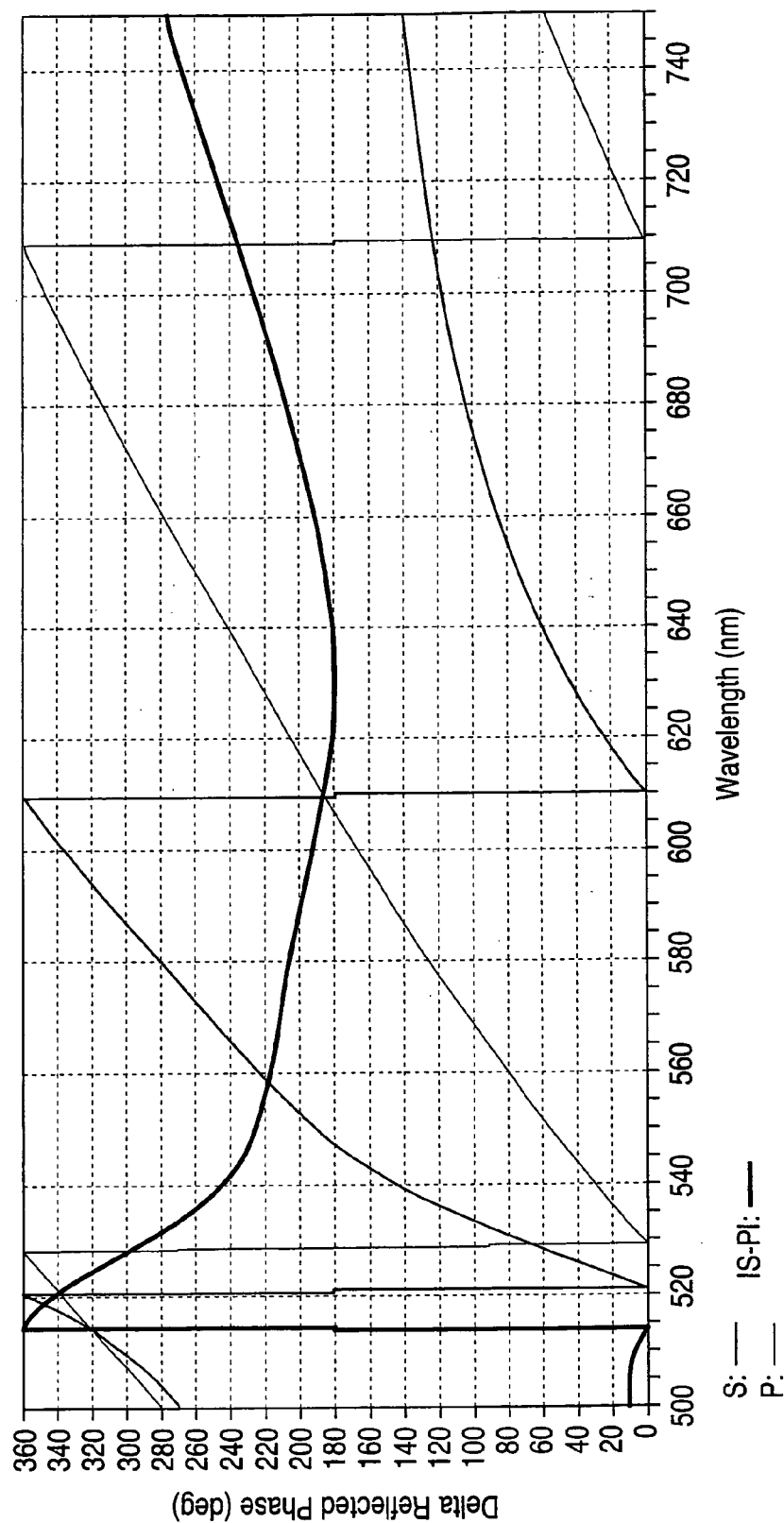

Here layer 1 is the first layer on the BK-7 surface. FIG. 13 illustrates the phase change with the coating of Table 3.

With the 180 degrees phase difference coating on all three faces, the output polarization state from a cube corner is now calculated.

Input Polarization

The input state is S polarized with respect to laboratory frame.

$$a_1 = -0.500 \quad (18.4)$$

$$a_2 = 0.866 \quad (18.5)$$

$$\delta_0 = 180 \text{ deg.} \quad (18.6)$$

Reflection 1
For reflection 1, $$\Delta = 0 \text{ deg.} \quad (18.7)$$

$$\tan\alpha = -0.866/0.500 = -1.732. \quad (18.8)$$

$$\cos(\Delta+\delta_0) = \{(1-\tan^2\alpha)/\tan\alpha\}\tan 2\psi_1/2 \quad (19)$$

$$\sin 2\chi_1 = \{2\tan\alpha/(1+\tan^2\alpha)\}\sin(\Delta+\delta_0) \quad (20)$$

Solving equation 19 for the azimuth angle $\psi_1$ and equation 20 for the ellipticity angle $\chi_1$, $$\psi_1 = -30 \text{ deg.} \quad (20.1)$$

$$\chi_1 = 0 \text{ deg.} \quad (20.2)$$

Figure 14:
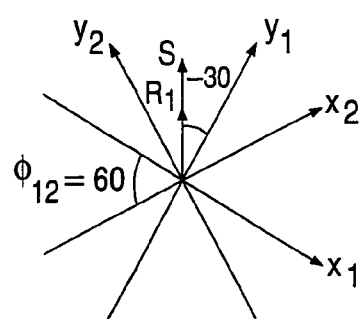

FIG. 14 shows that the reflected $R_1$ is collinear with the input state. The apparent magnitude difference between S and $R_1$, in FIG. 14, is only meant for clarity, since for TIR the reflected amplitude is equal to that of the incident.

With respect to frame 2, $$\psi_{12} = \psi_1 + 60 = 30 \text{ deg.} \quad (20.3)$$

$$\psi = 90 - \psi_{12} \quad (20.4)$$

$$\tan\alpha_{12} = \{(1-\cos 2\chi_1\cos 2\psi)/(1+\cos 2\chi_1\cos 2\psi)\}^{1/2} \quad (20.5)$$
$$= 1.732$$

$$\cos\delta_{12} = \{(1-\tan^2\alpha_{12})/\tan\alpha_{12}\}\tan 2\psi_{12}/2 \quad (20.6)$$

$$\delta_{12} = 180 \text{ deg.} \quad (20.7)$$

Reflection 2
For reflection 2, $$\Delta = 0 \text{ deg.} \quad (20.8)$$

$$\tan\alpha = \tan\alpha_{12} = 1.732 \quad (20.9)$$

$$\cos(\Delta+\delta_{12}) = \{(1-\tan^2\alpha)/\tan\alpha\}\tan 2\psi_2/2 \quad (21)$$

$$\sin 2\chi_2 = \{2\tan\alpha/(1+\tan^2\alpha)\}\sin((\Delta+\delta_{12})) \quad (22)$$

Solving equation 21 for the azimuth angle $\psi_2$ and equation 22 for the ellipticity angle $\chi_2$, $$\psi_2 = 30 \text{ deg.} \quad (22.1)$$

$$\chi_2 = 0 \text{ deg.} \quad (22.2)$$

Figure 15:
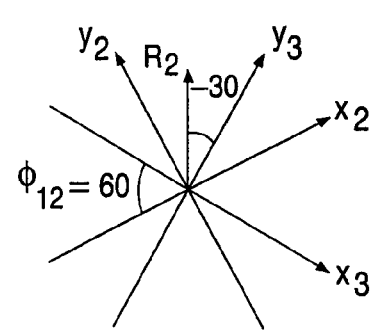

The angle that $R_2$ forms relative to the y3-axis is shown in FIG. 15. This angle is, $$\psi_{23} = \psi_2 - 60 = -30 \text{ deg.} \quad (22.3)$$

$$\psi = 90 - \psi_{23} \quad (22.4)$$

$$\tan\alpha_{23} = \{(1-\cos 2\chi_2\cos 2\psi)/(1+\cos 2\chi_2\cos 2\psi)\}^{1/2} \quad (22.5)$$
$$= -1.732$$

$$\cos\delta_{23} = \{(1-\tan^2\alpha_{23})/\tan\alpha_{23}\}\tan 2\psi_{23}/2 \quad (22.6)$$

$$\delta_{23} = 180 \text{ deg.}$$

Reflection 3
For reflection 3, $$\Delta = 0 \text{ deg.} \quad (22.7)$$

$$\tan\alpha = \tan\alpha_{23} = -1.732. \quad (22.8)$$

$$\cos(\Delta+\delta_{23}) = \{(1-\tan^2\alpha)/\tan\alpha\}\tan 2\psi_3/2 \quad (23)$$

$$\sin 2\chi_3 = \{2\tan\alpha/(1+\tan^2\alpha)\}\sin(\Delta+\delta_{23}) \quad (24)$$

Solving equation 23 for the azimuth angle $\psi_3$ and equation 24 for the ellipticity angle $\chi_3$, $$\psi_3 = -30 \text{ deg.} \quad (24.1)$$

$$\chi_3 = 0 \text{ deg.} \quad (24.2)$$

Figure 16A:
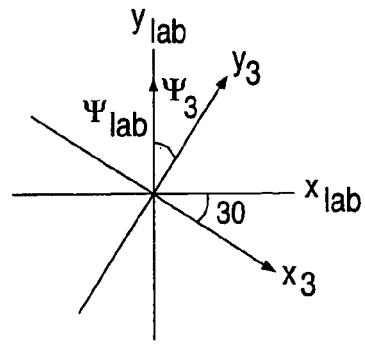

As shown in FIG. 16A, the azimuth angle relative to laboratory frame is given by, $$\psi_{lab} = 30 + \psi_3 \quad (24.3)$$
$$= 0 \text{ deg.}$$

This is the exact result that was obtained in Case I, where all sides were coated with zero degree phase difference coating (in Table 2). Therefore, Cases I, II and III all produce the same result for linearly polarized input states.

Case IV: Additional Designs of Phase-Compensating Film Stack

Figure 16B:
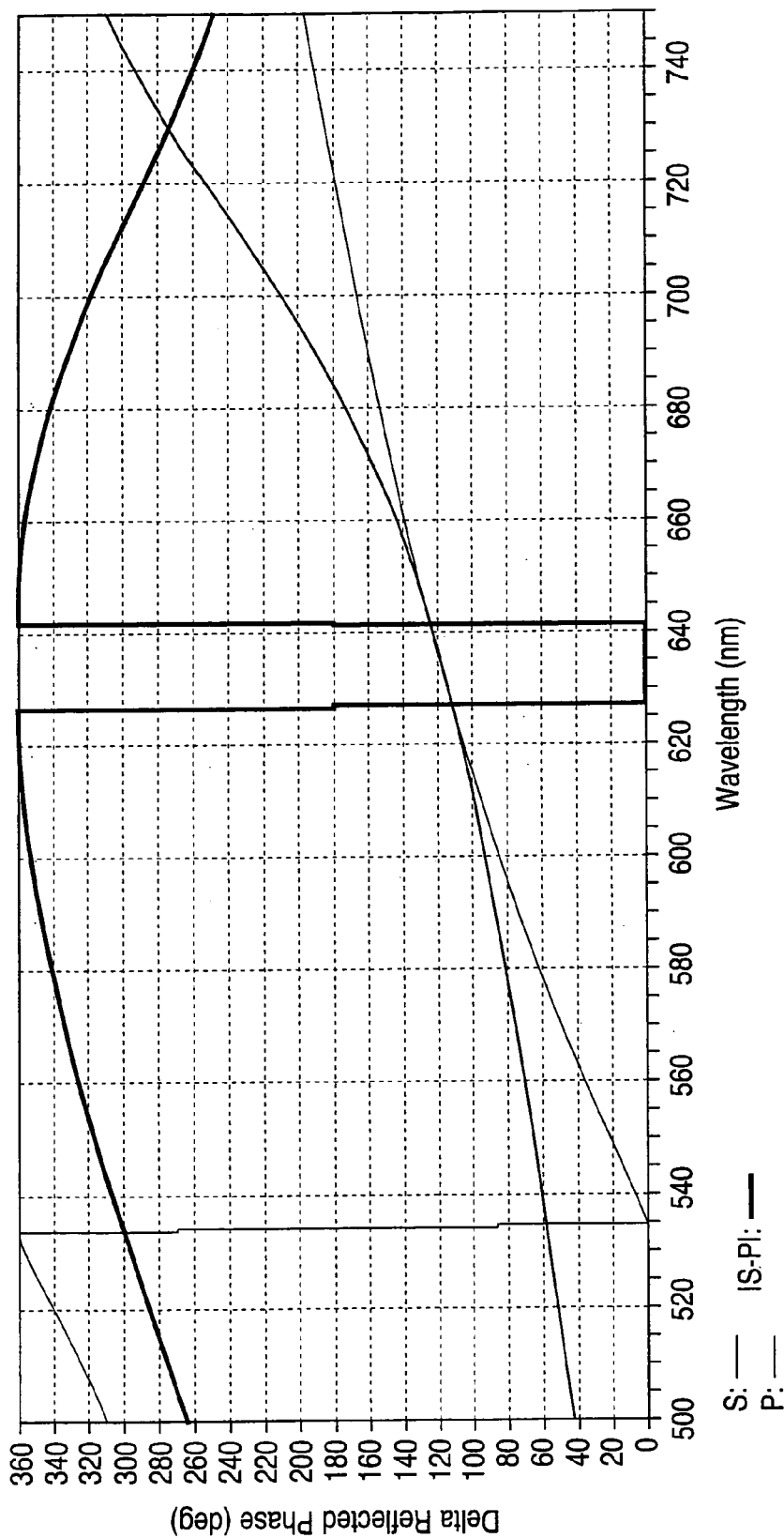
FIGS. 16B and 16C illustrate the reflected phase from phase-compensated cube corners having 0 degree phase difference in embodiments of the invention.

In one embodiment, the thin film stack on the cube corner induces 0 degree phase difference on reflection (i.e., Δ=180 degrees). The coating design is shown in Table 4. FIG. 16B illustrates the phase change with the coating of Table 4.

TABLE 4

0 degree phase difference

| Layer# | Material | Index (at 633 nm) | QWOT (nm) |
|---|---|---|---|
| 1 | MgF2 | 1.38 | 715 |
| 2 | TiO2 | 2.45 | 1903 |

Here layer 1 is the first layer on the BK-7 surface.

Figure 16C:
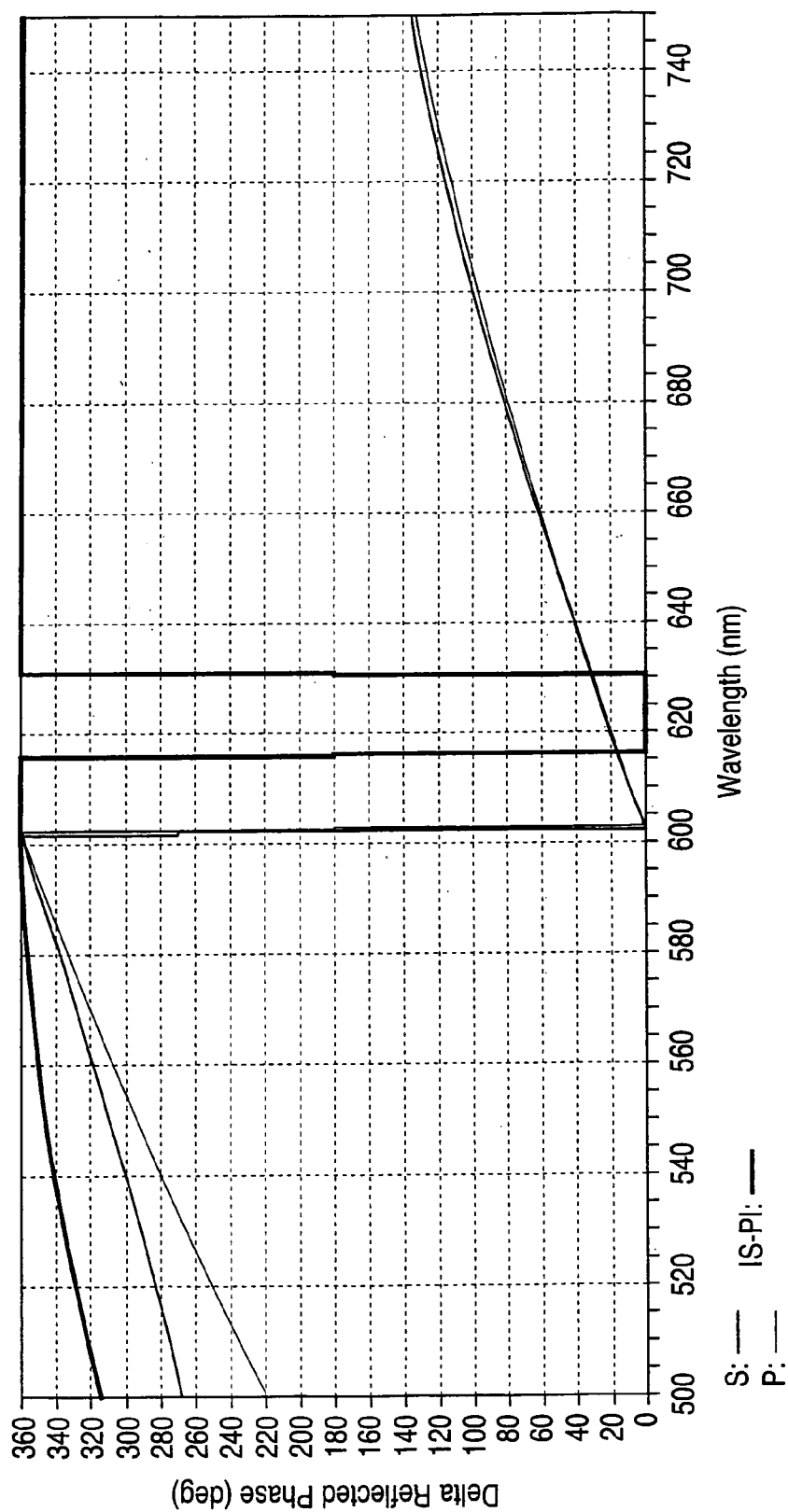

In another embodiment, the thin film stack on the cube corner induces 0 degree phase difference on reflection. The coating design is shown in Table 5. Please note that the lower TiO2 index is a result of a deposition process without ion-assistance. FIG. 16C illustrates the phase change with the coating of Table 5.

TABLE 5

0 degree phase difference

| Layer# | Material | Index (at 633 nm) | QWOT (nm) |
|---|---|---|---|
| 1 | TiO2 | 2.30 | 262.5 |
| 2 | SiO2 | 1.45 | 346.5 |
| 3 | TiO2 | 2.30 | 1018.5 |
| 4 | SiO2 | 1.45 | 462 |
| 5 | TiO2 | 2.30 | 850.5 |

Here layer 1 is the first layer on the BK-7 surface.

For linearly polarized input states, the coating designs of Tables 4 and 5 would produce the desired result if all three faces or only the first and the third faces are coated. For circularly polarized input states, the coating designs of Tables 4 and 5 would produce the desired result if all three faces are coated.

Application to Interferometry Systems

Plane Mirror Interferometer

Figure 17A:
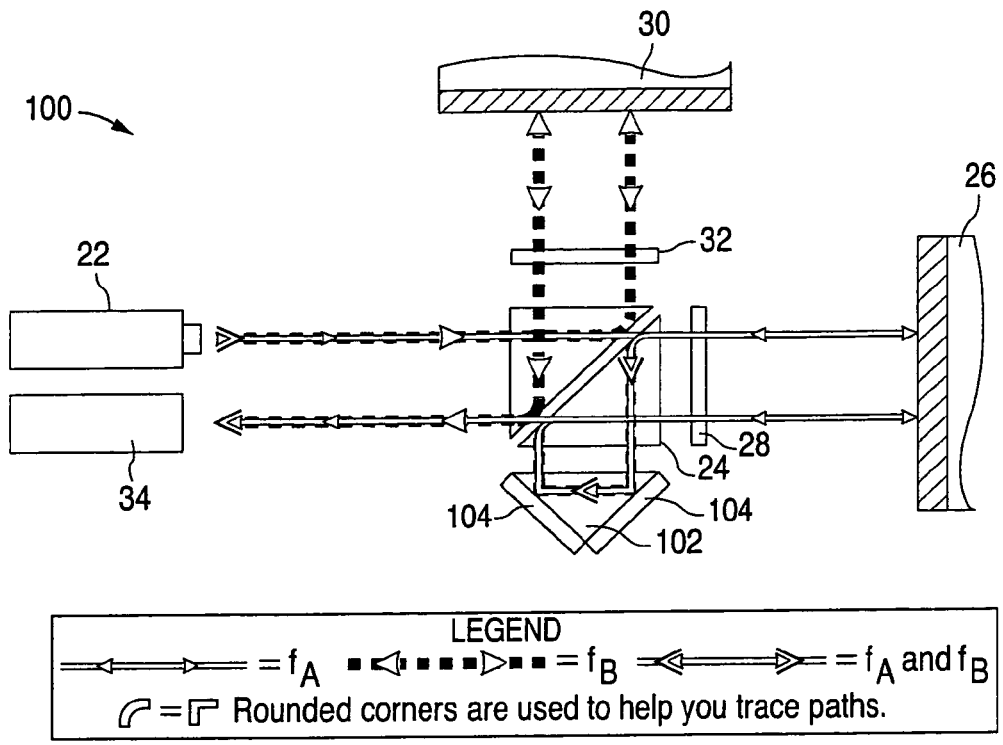
FIG. 17A illustrates a plane mirror interferometer system in one embodiment of the invention.

FIG. 17A illustrates a plane mirror interferometer system 100 in one embodiment of the invention. System 100 is similar to system 20 of FIG. 2 except that the conventional cube corner 10 has been replaced with a CC retroreflector 102 having phase-compensated interference film stacks 104. Depending on the embodiment, phase-compensated CC retroreflector 102 can be any of the CC retroreflectors with a phase-compensating film stack deposited on all three reflecting faces or only the first and the third reflecting faces as described above. As CC retroreflector 102 only handles linearly polarized input states, any film stack that induces nπ degree phase difference upon reflection can be used (e.g., 0 degree phase difference and Δ=180 degrees, and 180 degrees phase difference and Δ=0 degree) when all three faces are coated. A film stack that induces 2nπ degree phase difference upon reflection can be used when all three faces or only the first and the third reflecting faces are coated. Whenever nπ and 2nπ are mentioned, n is an integer including 0.

Although not shown, a 45 degree mirror can be placed in the reference path so reference mirror 30 is parallel to measurement mirror 26. The 45 degree mirror would be interposed between polarizing beam-splitter 24 and quarter-wave plate 32. The reference mirror 30 can be mounted to a moving component to provide a differential measurement relative to measurement mirror 26.

Figure 17B:
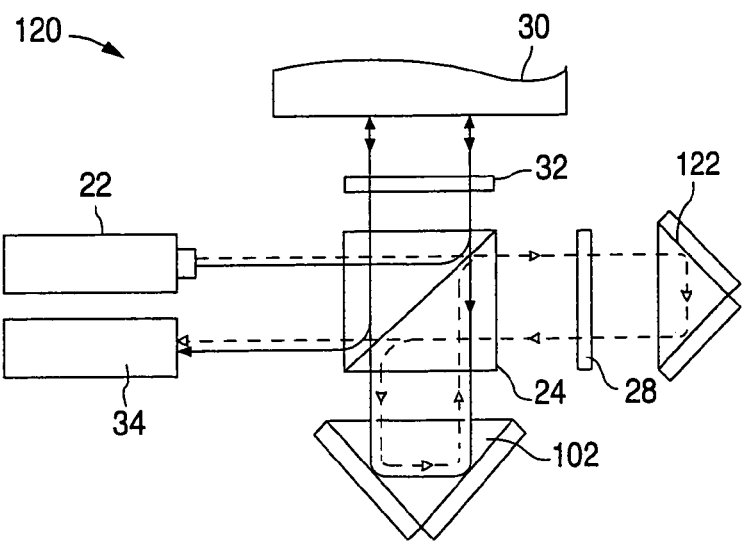
FIGS. 17B and 17C illustrate interferometer systems in embodiments of the invention.

FIG. 17B illustrates an interferometer system 120 in one embodiment of the invention. System 120 is similar to system 100 of FIG. 17A except that measurement mirror 26 has been replaced with a phase-compensated CC retroreflector 122. The measurement path has changed as follows.

In the measurement path, polarizing beam-splitter 24 transmits frequency component $f_A$ to phase-compensated cube corner 122 mounted to a moving stage. Since frequency component $f_A$ passes through a quarter-wave plate 28, the returning polarization is rotated 90 degrees and the newly S-polarized frequency component $f_A$ is reflected by polarizing beam-splitter 24 to phase-compensated CC retroreflector 102. Note that after passing through quarter-wave plate 28, component $f_A$ is circularly polarized when it is incident on CC retroreflector 122.

CC retroreflector 102 directs frequency component $f_A$ again to polarizing beam-splitter 24, which again reflects frequency component $f_A$ to CC retroreflector 122. Again, since frequency component $f_A$ passes through quarter-wave plate 28, the returning polarization is rotated 90 degrees and the newly P-polarized frequency component $f_A$ is transmitted through polarizing beam-splitter 24 onto a receiver 34. Note again that after passing through quarter-wave plate 28, component $f_A$ is circularly polarized when it is incident on CC retroreflector 122.

Depending on the embodiment CC retroreflector 122 can be any of the CC retroreflectors with a phase-compensating film stack that induces 2nπ degree phase difference upon reflection deposited on all three reflecting faces as described above (e.g., 0 degree phase difference and Δ=180 degrees). This is because CC retroreflector 122 must return a right circularly polarized light as a left circularly polarized light (or vice versa) so that after passing through quarter-wave plate 28, polarizing beam-splitter 24 would send the light onto the correct path. The handedness of the polarization is defined with the beam coming towards the observer.

Figure 17C:
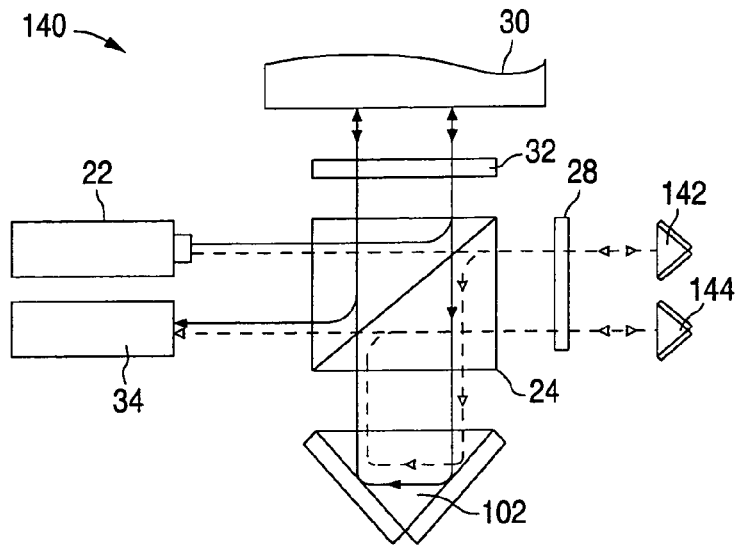

FIG. 17C illustrates an interferometer system 140 in one embodiment of the invention. System 140 is similar to system 120 of FIG. 17B except that CC retroreflector 122 has been replaced with phase-compensated CC retroreflectors 142 and 144. The measurement path has changed as follows.

Polarizing beam-splitter 24 transmits frequency component $f_A$ to phase-compensated CC retroreflector 142 mounted to a moving stage. Since frequency component $f_A$ passes through a quarter-wave plate 28, the returning polarization is rotated 90 degrees and the newly S-polarized frequency component $f_A$ is reflected by polarizing beam-splitter 24 to phase-compensated CC retroreflector 102. Note that after passing through quarter-wave plate 28, component $f_A$ is circularly polarized when it is incident on CC retroreflector 142.

CC retroreflector 102 directs frequency component $f_A$ again to polarizing beam-splitter 24, which reflects frequency component $f_A$ to phase-compensated CC retroreflector 144. Again, since frequency component $f_A$ passes through quarter-wave plate 28, the returning polarization is rotated 90 degrees and the newly P-polarized frequency component $f_A$ is transmitted through polarizing beam-splitter 24 onto a receiver 34. Note that after passing through quarter-wave plate 28, component $f_A$ is circularly polarized when it is incident on CC retroreflector 144.

Depending on the embodiment, CC retroreflectors 142 and 144 can be any of the CC retroreflectors with a phase-compensating film stack that causes $2n\pi$ degree phase difference upon reflection deposited on all three reflecting faces as described above. This is because CC retroreflectors 142 and 144 must return a right circularly polarized light as a left circularly polarized light (or vice versa) so that after passing through quarter-wave plate 28, polarizing beam-splitter 24 would send the light onto the correct path. The handedness of the polarization is defined with the beam coming towards the observer.

Differential Interferometer System

Figure 18A:
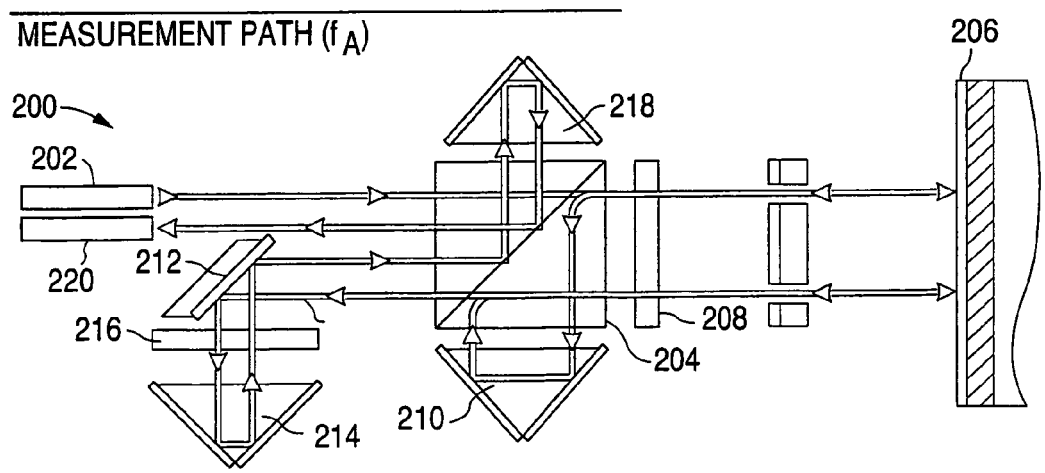

FIGS. 18A, 18B, and 18C illustrate a differential interferometer system 200 in one embodiment of invention. A laser head 202 generates a coherent, collimated light beam consisting of two orthogonally polarized frequency components. One frequency component $f_A$ (e.g., a measurement beam having a P-polarization) enters the interferometer's measurement path while the other frequency component $f_B$ (e.g., a reference beam having an S-polarization) enters the interferometer's reference path.

In the measurement path, a polarizing beam-splitter 204 transmits frequency component $f_A$ to a measurement plane mirror 206 mounted to a moving stage. Since frequency component $f_A$ passes through a quarter-wave plate 208, the returning polarization is rotated 90 degrees and the newly S-polarized frequency component $f_A$ is reflected by polarizing beam-splitter 204 to a phase-compensated CC retroreflector 210. CC retroreflector 210 directs frequency component $f_A$ again to polarizing beam-splitter 204, which again reflects frequency component $f_A$ to measurement plane mirror 206. Again, since frequency component $f_A$ passes through quarter-wave plate 208, the returning polarization is rotated 90 degrees and the newly P-polarized frequency component $f_A$ is transmitted through polarizing beam-splitter 204 on a mirror 212.

Mirror 212 directs frequency component $f_A$ to a phase-compensated CC retroreflector 214, which returns frequency component $f_A$ back to mirror 212. Since frequency component $f_A$ passes through quarter-wave plate 216, the returning polarization is rotated 90 degrees. Mirror 212 then returns the newly S-polarized frequency component $f_A$ to polarizing beam-splitter 204, which reflects frequency component $f_A$ to a phase-compensated CC retroreflector 218. CC retroreflector 218 returns frequency component $f_A$ to polarizing beam-splitter 204, which reflects frequency component $f_A$ to a receiver 220.

In the reference path, polarizing beam-splitter 204 reflects frequency component $f_B$ to phase-compensated CC retroreflector 218. Phase-compensated CC retroreflector 218 returns frequency component $f_B$ to polarizing beam-splitter 204, which reflects frequency component $f_B$ to mirror 212. Mirror 212 directs frequency component $f_B$ to phase-compensated CC retroreflector 214, which returns frequency component $f_B$ back to mirror 212. Since frequency component $f_B$ passes through quarter-wave plate 216, the returning polarization is rotated 90 degrees.

Mirror 212 directs the newly P-polarized frequency component $f_B$ to polarizing beam-splitter 204, which transmitted frequency component $f_B$ to a reference mirror 222 that may move. Since frequency component $f_B$ passes through a quarter-wave plate 208, the returning polarization is rotated 90 degrees and the newly S-polarized frequency component $f_B$ is reflected by polarizing beam-splitter 204 to phase-compensated CC retroreflector 210. CC retroreflector 210 returns frequency component $f_B$ to polarizing beam-splitter 204, which again reflects frequency component $f_B$ to reference mirror 222. Again, since frequency component $f_B$ passes through quarter-wave plate 208, the returning polarization is rotated 90 degrees and the P-polarized frequency component $f_B$ is transmitted through polarizing beam-splitter 204 onto receiver 220.

Depending on the embodiment, phase-compensated CC retroreflector 214 can be any of the CC retroreflectors with a phase-compensating film stack that induces $2n\pi$ degree difference upon reflection deposited on all three reflecting faces as described above. This is because it must return a right circularly polarized light as a left circularly polarized light (or vice versa) so that after passing through quarter-wave plate 216, polarizing beam-splitter 204 would send the light onto the correct path. The handedness of the polarization is defined with the beam coming towards the observer.

Depending on the embodiment, phase compensated CC retroreflectors 210 and 218 can be any of the CC retroreflectors with a phase-compensating film stack deposited on all three reflecting faces. The film stack is deposited on all three reflecting faces because components $f_A$ and $f_B$ may strike the reflecting faces of the retroreflectors in different orders. As CC retroreflectors 210 and 218 handle only linearly polarized input states, any film stack that induces $n\pi$ degree difference upon reflection can be used.

Single Beam Interferometer System

Figure 19:
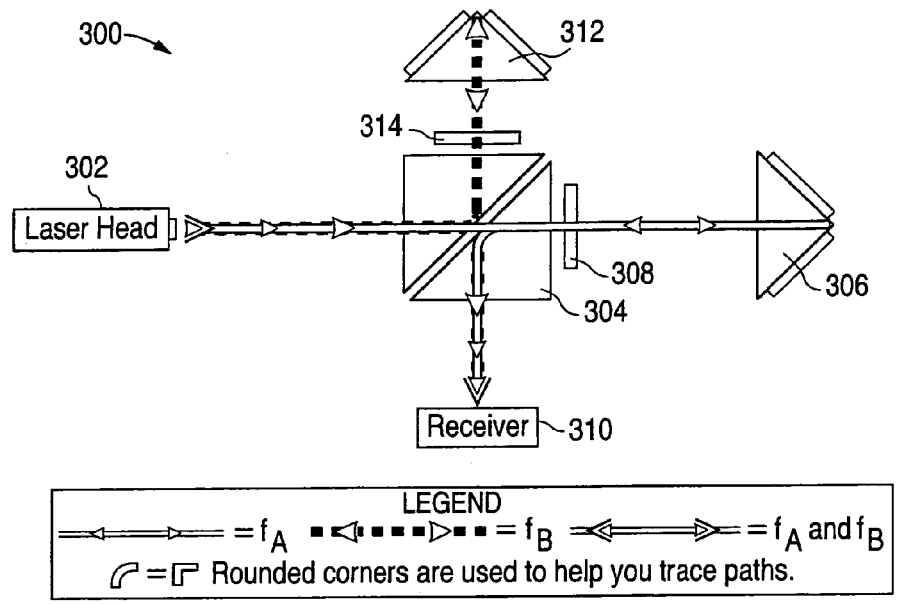
FIG. 19 illustrates a single beam interferometer system in one embodiment of the invention.

FIG. 19 illustrates a single beam interferometer system 300 in one embodiment of the invention. A laser head 302 generates a coherent, collimated light beam consisting of two orthogonally polarized frequency components. One frequency component $f_A$ (e.g., a measurement beam having a P-polarization) enters the interferometer's measurement path while the other frequency component $f_B$ (e.g., a reference beam having an S-polarization) enters the interferometer's reference path.

In the measurement path, a polarizing beam-splitter 304 transmits frequency component $f_A$ to a phase-compensated CC retroreflector 306 mounted to a moving stage. Since frequency component $f_A$ passes through a quarter-wave plate 308, the returning polarization is rotated 90 degrees and the newly S-polarized frequency component $f_A$ is reflected by polarizing beam-splitter 304 to a receiver 310.

In the reference path, polarizing beam-splitter 304 reflects frequency component $f_B$ to a phase-compensated CC retroreflector 312. Since frequency component $f_B$ passes through a quarter-wave plate 314, the returning polarization is rotated 90 degrees and the newly P-polarized frequency component $f_B$ is transmitted through polarizing beam-splitter 304 to receiver 310.

Depending on the embodiment, phase-compensated CC retroreflectors 306 and 312 can be any of the CC retroreflectors with a phase-compensating film stack that induces $2n\pi$ phase difference upon reflection deposited on all three reflecting faces as described above. This is because CC retroreflectors 306 and 312 must return a right circularly polarized light as a left circularly polarized light (or vice versa) so that after passing through corresponding quarter-wave plates 308 and 314, polarizing beam-splitter 304 would send the light onto the correct path. The handedness of the polarization is defined with the beam coming towards the observer.

High-Resolution Interferometer System

Figure 20A:
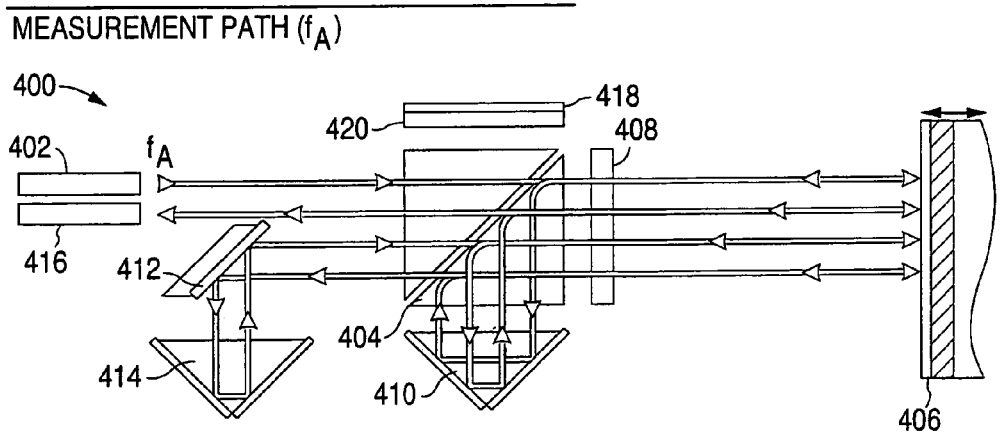
FIGS. 20A, 20B, and 20C illustrate a high-resolution interferometer system in one embodiment of the invention.
Figure 20B:
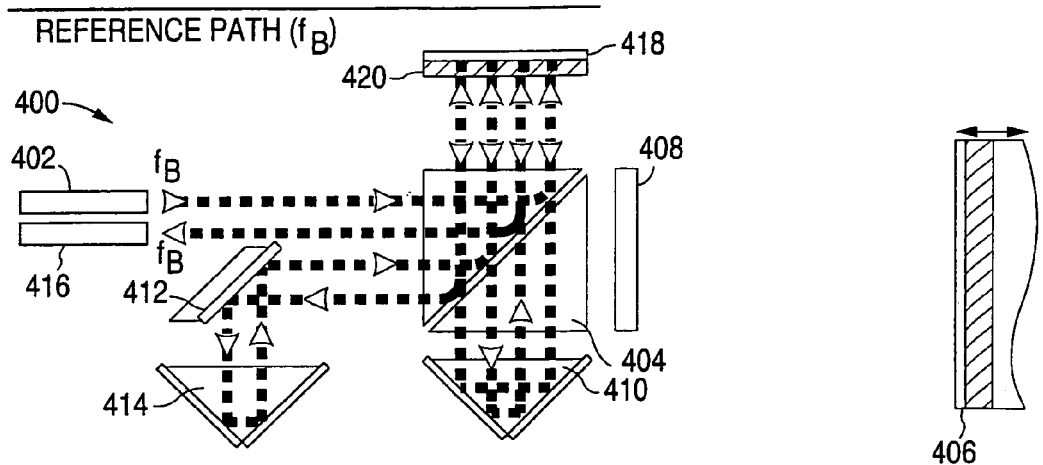
Figure 20C:
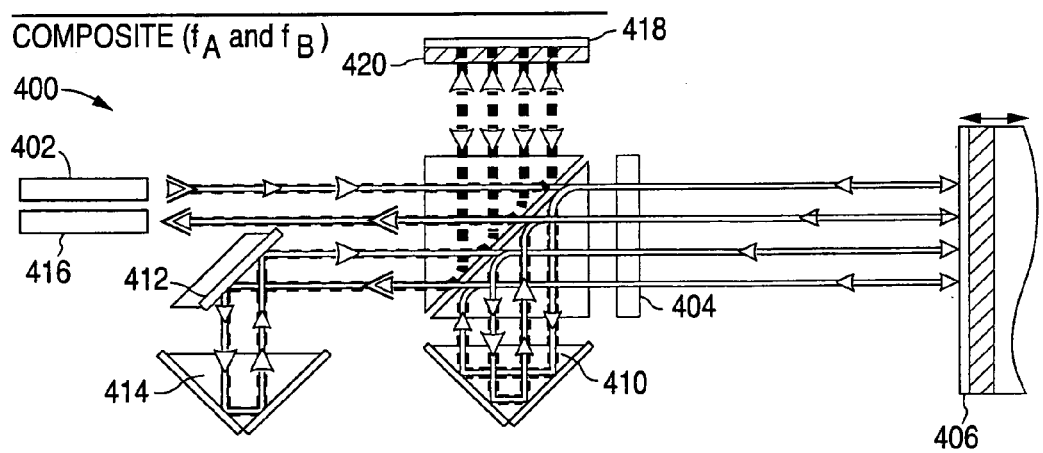

FIGS. 20A, 20B, and 20C illustrate a high-resolution interferometer system 400 in one embodiment of invention. A laser head 402 generates a coherent, collimated light beam consisting of two orthogonally polarized frequency components. One frequency component $f_A$ (e.g., a measurement beam having a P-polarization) enters the interferometer's measurement path while the other frequency component $f_B$ (e.g., a reference beam having an S-polarization) enters the interferometer's reference path.

In the measurement path, a polarizing beam-splitter 404 transmits frequency component $f_A$ to a measurement plane mirror 406 mounted to a moving stage. Since frequency component $f_A$ passes through a quarter-wave plate 408, the returning polarization is rotated 90 degrees and the newly S-polarized frequency component $f_A$ is reflected by polarizing beam-splitter 404 to a phase-compensated CC retroreflector 410. CC retroreflector 410 directs frequency component $f_A$ again to polarizing beam-splitter 404, which again reflects frequency component $f_A$ to measurement plane mirror 406. Again, since frequency component $f_A$ passes through quarter-wave plate 408, the returning polarization is rotated 90 degrees and the newly P-polarized frequency component $f_A$ is transmitted through polarizing beam-splitter 404 on a mirror 412.

Mirror 412 directs frequency component $f_A$ to a phase-compensated CC retroreflector 414, which returns frequency component $f_A$ back to mirror 412. Mirror 412 then returns frequency component $f_A$ to polarizing beam-splitter 204, which transmits frequency component $f_A$ to plane mirror 406. Again, since frequency component $f_A$ passes through quarter-wave plate 408, the returning polarization is rotated 90 degrees and the newly S-polarized frequency component $f_A$ is reflected by polarizing beam-splitter 404 to phase-compensated CC retroreflector 410. CC retroreflector 410 directs frequency component $f_A$ again to polarizing beam-splitter 404, which again reflects frequency component $f_A$ to measurement plane mirror 406. Again, since frequency component $f_A$ passes through quarter-wave plate 408, the returning polarization is rotated 90 degrees and the newly P-polarized frequency component $f_A$ is transmitted through polarizing beam-splitter 404 to a receiver 416.

In the reference path, polarizing beam-splitter 404 reflects frequency component $f_B$ to a mirror 418. Since frequency component $f_B$ passes through quarter-wave plate 420, the returning polarization is rotated 90 degrees and the newly P-polarized frequency component $f_B$ is transmitted through polarizing beam-splitter 404 to phase-compensated CC retroreflector 410. CC retroreflector 410 returns frequency component $f_B$ to polarizing beam-splitter 404, which transmits frequency component $f_B$ to mirror 418. Again, since frequency component $f_B$ passes through quarter-wave plate 420, the returning polarization is rotated 90 degrees and the newly S-polarized frequency component $f_B$ is reflected by polarizing beam-splitter 404 to mirror 412.

Mirror 412 directs frequency component $f_B$ to phase-compensated CC retroreflector 414, which returns frequency component $f_B$ back to mirror 412. Mirror 412 then returns frequency component $f_B$ to polarizing beam-splitter 204, which reflects frequency component $f_B$ to mirror 420. Since frequency component $f_B$ passes through quarter-wave plate 420, the returning polarization is rotated 90 degrees and the newly P-polarized frequency component $f_B$ is transmitted by polarizing beam-splitter 404 to phase-compensated CC retroreflector 410. CC retroreflector 410 returns frequency component $f_B$ to polarizing beam-splitter 404, which transmits frequency component $f_B$ to mirror 418. Again, since frequency component $f_B$ passes through quarter-wave plate 420, the returning polarization is rotated 90 degrees and the newly S-polarized frequency component $f_B$ is reflected by polarizing beam-splitter 404 to receiver 416.

Depending on the embodiment, phase-compensated CC retroreflector 414 can be any of the CC retroreflectors with a phase-compensating film stack deposited on all three reflecting faces or only the first and the third faces as described above. The phase-compensating film stack that induces nπ degree phase difference upon reflection can be used when all three faces are coated. A film stack that induces 2nπ degree phase difference upon reflection can be used when all three faces or only the first and the third reflecting faces are coated.

Depending on the embodiment, phase-compensated CC retroreflector 410 can be any of the CC retroreflectors with a phase-compensating film stack deposited on all three reflecting faces. The film stack is deposited on all three faces because components $f_A$ and $f_B$ each makes two passes through the cube corner and may strike the faces in different orders. As CC retroreflector 410 only handle linearly polarized input states, any phase-compensating interference film that induces nπ phase difference upon reflection can be used.

Linear Interferometer System

Figure 21:
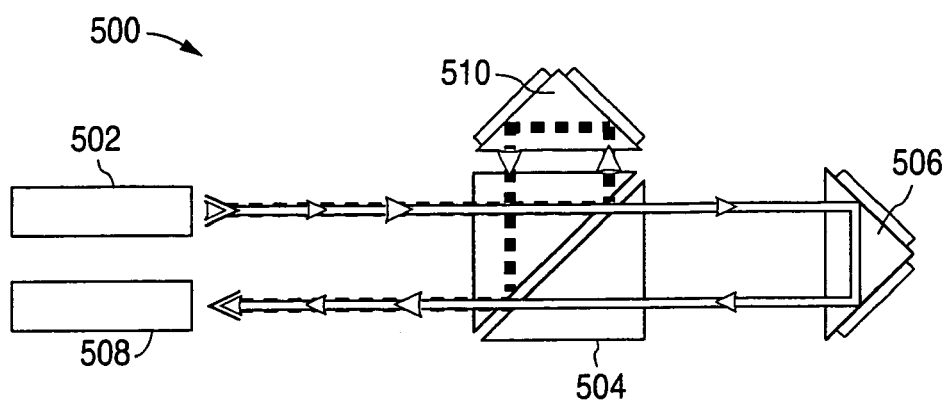
FIG. 21 illustrates a linear interferometer system in one embodiment of the invention.
Figure 21:
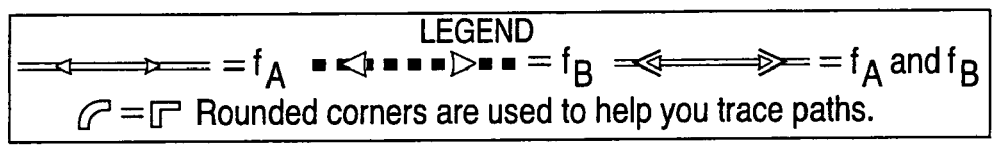

FIG. 21 illustrates a linear interferometer system 500 in one embodiment of the invention. A laser head 502 generates a coherent, collimated light beam consisting of two orthogonally polarized frequency components. One frequency component $f_A$ (e.g., a measurement beam having a P-polarization) enters the interferometer's measurement path while the other frequency component $f_B$ (e.g., a reference beam having an S-polarization) enters the interferometer's reference path.

In the measurement path, a polarizing beam-splitter 504 transmits frequency component $f_A$ to a phase-compensated CC retroreflector 506 mounted to a moving stage. Phase-compensated retroreflector 506 returns frequency component $f_A$ to polarizing beam splitter 504, which transmits the frequency component $f_A$ to a receiver 508.

In the reference path, polarizing beam-splitter 504 reflects frequency component $f_B$ to a phase-compensated CC retroreflector 510. Phase-compensated retroreflector 510 returns frequency component $f_B$ to polarizing beam splitter 504, which reflects the frequency component $f_B$ to receiver 508.

Depending on the embodiment, phase-compensated CC retroreflectors 506 and 510 can be any of the CC retroreflectors with a phase-compensating film stack deposited on all three reflecting faces or only the first and the third reflecting faces as described above. The phase-compensating film stack that induces nπ degree phase difference upon reflection can be used when all three faces are coated. A film stack that induces 2nπ degree phase difference upon reflection can be used when all three faces or only the first and the third reflecting faces are coated.

Summary

With the aid of a numerical model, polarization effects from a TIR cube corner were analyzed. This model predicts significant changes to the azimuth and ellipticity angles of incident polarization from an uncoated cube corner. As a consequence, multilayer interference coatings were designed to produce zero and 180 degrees phase difference between S and P states for TIR reflection. The results indicate that with all or only first and third faces coated, the azimuth and ellipticity angles of the initial polarization were preserved.

Various other adaptations and combinations of features of the embodiments disclosed are within the scope of the invention. Although the various interferometry systems described above use vertically and horizontally polarized light, the interferometry systems can also use left and right circularly polarized light. Although the various interferometry systems described above show measurement along a single axis, it is understood that these systems could be adopted for multi-axes measurement by replicating the set-ups or integrating the single-axis measurement components into a multi-axes module. Although specific coating designs for BK-7 cube corners are disclosed, one skilled in the art can modify the coating designs for cube corners made of other materials such as fused silica, SF-10, and etc. Furthermore, one skilled in the art can modify the coating designs to suit other operating wavelengths. Numerous embodiments are encompassed by the following claims.

Appendix I

For a monochromatic plane wave E propagating in the z direction with coordinates $E_x$ and $E_y$, $$E_x = a_1 \cos(\tau + \delta_1) \quad \text{I.1.a}$$

$$E_y = a_2 \cos(\tau + \delta_2) \quad \text{I.1.b}$$

$$E_z = 0, \quad \text{I.1c}$$

where $a_1$ is the amplitude along the x-axis, $\delta_1$ is the phase along the x-axis (please note this is different from the relative phase difference $\delta_1$ after reflection from the first face described above), $a_2$ is the amplitude along the y-axis, $\delta_2$ is the phase along the y-axis (please note this is different from the relative phase difference $\delta_2$ after reflection from the second face described above), $\tau = \omega t - kz$, $\omega$ is angular frequency, t is time, k is wave number ($2\pi/\lambda$), and z is propagation direction.

Rewriting (I.1.a) and (I.1.b), $$E_x/a_1 = \cos(\tau + \delta_1) = \cos\tau\cos\delta_1 - \sin\tau\sin\delta_1 \quad \text{I.1.d}$$

$$E_y/a_2 = \cos(\tau + \delta_2) = \cos\tau\cos\delta_2 - \sin\tau\sin\delta_2. \quad \text{I.1.e}$$

To eliminate $\tau$ dependence, we multiply each component by $\sin\delta_1$, $\sin\delta_2$, $\cos\delta_1$ and $\cos\delta_2$:

$$(E_x/a_1)\sin\delta_2 = \sin\delta_2(\cos\tau\cos\delta_1 - \sin\tau\sin\delta_1) \quad \text{I.2.}$$

$$(E_y/a_2)\sin\delta_1 = \sin\delta_1(\cos\tau\cos\delta_2 - \sin\tau\sin\delta_2) \quad \text{I.2.}$$

$$(E_x/a_1)\cos\delta_2 = \cos\delta_2(\cos\tau\cos\delta_1 - \sin\tau\sin\delta_1) \quad \text{I.2.}$$

$$(E_y/a_2)\cos\delta_1 = \cos\delta_1(\cos\tau\cos\delta_2 - \sin\tau\sin\delta_2) \quad \text{I.2.}$$

Subtracting (I.2.b) from (I.2.a), $$(E_x/a_1)\sin\delta_2 - (E_y/a_2)\sin\delta_1 = \cos\tau\sin(\delta_2 - \delta_1). \quad \text{I.1.a}$$

Subtracting (I.2.d) from (I.2.c), $$(E_x/a_1)\cos\delta_2 - (E_y/a_2)\cos\delta_1 = \sin\tau\sin(\delta_2 - \delta_1). \quad \text{I.3.b}$$

Squaring and adding (I.3.a) and (I.3.b) yields, $$(E_x/a_1)^2 + (E_y/a_2)^2 - 2(E_x/a_1)(E_y/a_2)(\sin\delta_2\sin\delta_1 + \cos\delta_1\cos\delta_2) = \sin^2(\delta_2 - \delta_1)$$

and simplifying, $$(E_x/a_1)^2 + (E_y/a_2)^2 - 2(E_x/a_1)(E_y/a_2)\cos(\delta_2 - \delta_1) = \sin^2(\delta_2 - \delta_1). \quad \text{I.4}$$

Appendix II

In the rotated coordinate system $(\xi, \eta)$, the components of the electric vector are related by, $$E_\xi = E_x\cos\psi + E_y\sin\psi \quad \text{II.1.a}$$

$$E_\eta = -E_x\sin\psi + E_y\cos\psi, \quad \text{II.1.b}$$

where $\psi$ is the angle between $(\xi, \eta)$ and $(x, y)$ coordinate axes. In the $(\xi, \eta)$ coordinate system, the equation for the electric vector is given by, $$E_\xi = a^*\cos(\tau + \delta_\xi) \quad \text{II.2.a}$$

$$E_\eta = b^*\cos(\tau + \delta_\eta), \quad \text{II.2.b}$$

where a is the amplitude along the $\xi$-axis, b is the amplitude along the $\eta$-axis, and $\tau = \omega t - kz$. Then using the results of equation II.2.a and II.2.b, the expressions for the electric vector reduces to, $$E_\xi = a^*\cos(\tau + \delta_\xi) \quad \text{II.2.c}$$

$$E_\eta = +/- b^*\sin(\tau + \delta_\xi). \quad \text{II.2.d}$$

Now a relationship between the amplitudes a, b of the rotated frame and $a_1$, $a_2$ of the x, y frame is established. First equations I.1.a, I.1.b, II.2.c and (II.2.d) are expanded as follows:

$$E_x = a_1\cos(\tau + \delta_1) = a_1(\cos\tau\cos\delta_1 - \sin\tau\sin\delta_1) \quad \text{II.}$$

$$E_y = a_2\cos(\tau + \delta_2) = a_2(\cos\tau\cos\delta_2 - \sin\tau\sin\delta_2) \quad \text{II.}$$

$$E_\xi = a^*\cos(\tau + \delta_\xi) = a(\cos\tau\cos\delta_\xi - \sin\tau\sin\delta_2) \quad \text{II.3.c}$$

$$E_\eta = +/- b^*\sin(\tau + \delta_\xi) = +/- b(\sin\tau\cos\delta_\xi + \cos\tau\sin\delta\sin\delta_\xi) \quad \text{II.3.}$$

Combining equation II.1.a and II.1.b with equations II.3.a and II.3.b, $$E_\xi = a_1(\cos\tau\cos\delta_1 - \sin\tau\sin\delta_1)\cos\psi + a_2(\cos\tau\cos\delta_2 - \sin\tau\sin\delta_2)\sin\psi \quad \text{II.4.b}$$

$$E_\eta = -a_1(\cos\tau\cos\delta_1 - \sin\tau\sin\delta_1)\sin\psi + a_2(\cos\tau\cos\delta_2 - \sin\tau_2)\cos\psi \quad \text{II.4.b}$$

then equating the corresponding terms of equations II.3.c, II.3.d and equations II.4.a, II.4.b:

For $E_\xi$ equation,
  cos $\tau$ terms:

ti $a^*\cos\delta_\xi = a_1\cos\delta_1\cos\psi + a_2\cos\delta_2\sin\psi$ II.5.a
  sin $\tau$ terms:

$$a^*\sin\delta_\xi = a_1\sin\delta_1\cos\psi + a_2\sin\delta_2\sin\psi \quad \text{II.5.b}$$

For $E_\eta$ equations,
  cos $\tau$ terms:

$$+/- b^*\sin\delta_\xi = -a_1\cos\delta_1\sin\psi + a_2\cos\delta_2\cos\psi \quad \text{II.6.}$$

sin $\tau$ terms:

$$+/- b^*\cos\delta_\xi = a_1\sin\delta_1\sin\psi + a_2\sin\delta_2\cos\psi \quad \text{II.6.b}$$

Now squaring and adding equations II.5.a and II.5.b, $$a^2 = a_1^2\cos^2\psi + a_2^2\sin^2\psi + 2a_1a_2\cos\psi\sin\psi\cos(\delta_2 - \delta_1), \quad \text{II.7.a}$$

and performing the same operations with equations II.6.a and II.6.b, $$b^2 = a_1^2\sin^2\psi + a_2^2\cos^2\psi - 2a_1a_2\sin\psi\cos\psi\cos(\delta_2 - \delta_1) \quad \text{II.7.b}$$

Adding (II.7.a) and (II.7.b), $$a^2+b^2=a_1^2+a_2^2. \quad \text{II.8}$$

Next equations II.5.a and II.6.b are multiplied together and equations II.5.b and II.6.a are also multiplied together as follows:

$$+/-ab*\cos^2\delta_\xi = -a_1 a_2 \sin\delta_2 \cos\delta_1 \cos^2\psi + a_1 a_2 \sin\delta_1 \cos\delta_2 \sin^2\psi \quad \text{II.9.a}$$

$$+/-ab*\sin^2\delta_\xi = -a_1 a_2 \sin\delta_2 \cos\delta_1 \sin^2\psi + a_1 a_2 \sin\delta_2 \cos^2\psi \quad \text{II.9.b}$$

then adding (II.9.a) and (II.9.b), $$+/-ab = a_1 a_2 \sin(\delta_1-\delta_2)$$

or alternatively, $$-/+ab = a_1 a_2 \sin(\delta_2-\delta_1). \quad \text{II.10}$$

Furthermore, dividing equation II.6.b by equation II.5.a, and dividing equation II.6.a by equation II.5.b yields:

$$+/-b/a = (a_1 \sin\delta_1 \sin\psi - a_2 \sin\delta_2 \cos\psi)/(a_1 \cos\delta_1 \cos\psi + a_2 \cos\delta \sin\psi) \quad \text{II.11.a}$$

$$+/-b/a = (-a_1 \cos\delta_1 \sin\psi + a_2 \cos\delta_2 \cos\psi)/(a_1 \sin\delta_1 \cos\psi + a_2 \delta_2 \sin\psi), \quad \text{II.11.b}$$

and equating the right hand side (RHS) of equations II.11.a and II.11.b, $$(a_1^2-a_2^2)\sin 2\psi = 2a_1 a_2 \cos(\delta_2-\delta_1)\cos 2\psi$$

or equivalently, $$(a_1^2-a_2^2)\tan 2\psi = 2a_1 a_2 \cos\delta \quad \text{II.12}$$

where $\delta=\delta_2-\delta_1$.

The last relation is derived by multiplying equation II.10 by 2 and then dividing by equation II.8, $$-/+2ab/(a^2+b^2) = 2a_1 a_2 \sin\delta/(a_1^2+a_2^2) \quad \text{II.13}$$

Appendix III

To derive the expressions for the Stokes parameters, let us recall equations II.8, II.12, and II.13, $$a^2+b^2=a_1^2+a_2^2. \quad \text{(II.8)}$$

$$(a_1^2-a_2^2)\tan 2\psi = 2a_1 a_2 \cos\delta \quad \text{(II.12)}$$

$$-/+2ab/(a^2+b^2) = 2a_1 a_2 \sin\delta/(a_1^2+a_2^2) \quad \text{(II.13)}$$

and define $$\tan\alpha = a_2/a_1 \quad \text{(III.0.a)}$$

$$\tan\chi = +/-b/a. \quad \text{(III.0.b)}$$

From equation II.12, we make the following definitions:
Right Hand Side Definitions (RHS):

$$S_1 = a_1^2 - a_2^2 \quad \text{III.1}$$

$$S_2 = 2a_1 a_2 \cos\delta \quad \text{III.2}$$

Left Hand Side Definition (LHS):

$$S_2 = (a_1^2-a_2^2)\tan 2\psi \quad \text{III.3}$$

Similarly from equation II.13, we have the following definitions:
Right Hand Side Definition (RHS):

$$S_3 = 2a_1 a_2 \sin\delta \quad \text{III.4}$$

Left Hand Side Definition (LHS):

$$S_3 = -/+2ab(a_1^2+a_2^2)/(a^2+b^2) \quad \text{III.5}$$

Next defined is a dependent parameter $S_0$. This is defined by combining the squares of the RHS definitions of $S_1$, $S_2$ and $S_3$,
Right Hand Side Definition (RHS):

$$\begin{aligned}S_0^2 &= S_1^2 + S_2^2 + S_3^2 \\ &= (a_1^2-a_2^2)^2 + (2a_1 a_2 \cos\delta)^2 + (2a_1 a_2 \sin\delta)^2 \\ &= (a_1^2+a_2^2)^2 \end{aligned} \quad \text{III.6}$$

$$S_0 = a_1^2 + a_2^2$$

Left Hand Side Definition (LHS):

$$S_0^2 = S_1^2 + S_2^2 + S_3^2 \quad \text{III.7}$$

Taking next the LHS definition of $S_3$, $$S_3 = -/+2ab(a_1^2+a_2^2)/(a^2+b^2),$$

or alternatively with the substitution of equation III.6, $S_3$ becomes, $$S_3 = -/+2ab S_0/(a^2+b^2).$$

Further, note that $\tan\chi = -/+b/a$; and thus $S_3$ may be expressed as, $$S_3 = 2 S_0 \tan\chi/(1+\tan^2\chi) = S_0 \sin 2\chi$$

$$S_3 = S_0 \sin 2\chi. \quad \text{III.8}$$

Now to express $S_1$ and $S_2$ in terms of the parameters $S_0$, $\psi$ and $\chi$, we take the LHS definition of equation III.3 and rewrite it as, $$S_2 = S_1 \tan 2\psi. \quad \text{III.9}$$

Then substituting equations III.8 and III.9 into equation III.7, $$S_0^2 = S_1^2 + (S_1 \tan 2\psi)^2 + (S_0 \sin 2\chi)^2$$

and solving for $S_1$, $$S_1 = S_0 \cos 2\psi \cos 2\chi. \quad \text{III.10}$$

Now substitute equation III.10 into equation III.9 to arrive at a new form of $S_2$, $$S_2 = S_0 \sin 2\psi \cos 2\chi. \quad \text{III.11}$$

Summarizing the results, $$S_0^2 = S_1^2 + S_2^2 + S_3^2$$

$$S_1 = S_0 \cos 2\psi \cos 2\chi$$

$$S_2 = S_0 \sin 2\psi \cos 2\chi$$

$$S_3 = S_0 \sin 2\chi.$$

Expressing the Stokes parameters with respect to RHS definitions, $$S_0 = a_1^2 + a_2^2$$

$$S_1 = a_1^2 - a_2^2$$

$$S_2 = 2a_1 a_2 \cos\delta$$

$$S_3 = 2a_1 a_2 \sin\delta.$$

These RHS Stokes parameters are then normalize by dividing by $S_1$.

$s_0=1$ $s_1=(a_1^2-a_2^2)/(a_1^2+a_2^2)$      5

$s_2=2a_1a_2 \cos \delta/(a_1^2+a_2^2)$ $s_3=2a_1a_2 \sin \delta/(a_1^2+a_2^2)$.

Then expressing in terms of $\tan \alpha = a_2/a_1$, $s_0=1$      (III.12)

$s_1=(1-\tan^2 \alpha)/(1+\tan^2 \alpha)$      (III.13)

$s_2=2 \tan \alpha \cos \delta/(1+\tan^2 \alpha)$      (III.14)

$s_3=2 \tan \alpha \sin \delta/(1+\tan^2 \alpha)$      (III.15)

What is claimed is:

1. A phase-compensating cube corner retroreflector, comprising:
   an entrance/exit face devoid of any phase-compensating film stack;
   a first rear reflecting face;
   a phase-compensating film stack atop the first rear reflecting face, wherein the phase-compensating film stack induces $2n\pi$ phase difference in light upon reflection, wherein n is any integer including 0;
   a second rear reflecting face devoid of any phase-compensating film stack;
   a third rear reflecting face;
   another phase-compensating film stack atop the third rear reflecting face, wherein said another phase-compensating film stack induces the $2n\pi$ phase difference in light upon reflection;
   wherein light enters and exits the cube corner retroreflector with substantially the same polarization orientation and substantially the same polarization ellipticity.

2. The retroreflector of claim 1, wherein the phase-compensating film stack and said another phase-compensating film stack each comprises a stack of thin films wherein reflections from the thin films interfere to induce the $2n\pi$ phase difference, and an interface between the last film and air provides total internal reflection.

3. A phase-compensating cube corner retroreflector, comprising:
   an entrance/exit face;
   a first rear reflecting face;
   a phase-compensating film stack atop the first rear reflecting fact wherein the phase-compensating film stack induces $2n\pi$ phase difference in light upon reflection, wherein n is any integer including 0;
   a second rear reflecting face devoid of any phase-compensating film stack;
   a third rear reflecting face;
   another phase-compensating film stack atop the third rear reflecting face, wherein said another phase-compensating film stack induces the $2n\pi$ phase difference in light upon reflection;
   wherein light enters and exits the cube corner retroreflector with substantially the same polarization orientation and substantially the same polarization ellipticity,
   wherein the phase-compensating film stack and said another phase-compensating stack each comprises:
     a first layer atop the corresponding reflecting face, the first layer comprising of silicon dioxide having an optical thickness of approximately 815 nm;
     a second layer atop the first layer, the second layer comprising titanium dioxide having an optical thickness of approximately 1066 nm;
     a third layer atop the second layer, the third layer comprising silicon dioxide having an optical thickness of approximately 1090 nm; and
     a fourth layer atop the third layer, the fourth layer comprises titanium dioxide having an optical thickness of approximately 1702 nm.

4. A phase-compensating cube corner retroreflector, comprising:
   an entrance/exit face;
   a first rear reflecting face;
   a phase-compensating film stack atop the first rear reflecting face, wherein the phase-compensating film stack induces $2n\pi$ phase difference in light upon reflection, wherein n is any integer including 0;
   a second rear reflecting face devoid of any phase-compensating film stack;
   a third rear reflecting face;
   another phase-compensating film stack atop the third rear reflecting face, wherein said another phase-compensating film stack induces the $2n\pi$ phase difference in light upon reflection;
   wherein light enters and exits the cube corner retroreflector with substantially the same polarization orientation and substantially the same polarization ellipticity;
   wherein the phase-compensating film stack and said another phase-compensating stack each comprises:
     a first layer atop the corresponding reflecting face, the first layer comprising of magnesium dioxide having an optical thickness of approximately 715 nm; and
     a second layer atop the first layer, the second layer comprising titanium dioxide having an optical thickness of approximately 1903 nm.

5. A phase-compensating cube corner retroreflector, comprising:
   an entrance/exit face,
   a first rear reflecting face;
   a phase-compensating film stack atop the first rear reflecting face, wherein the phase-compensating film stack induces $2n\pi$ phase difference in light upon reflection, wherein n is any integer including 0;
   a second rear reflecting face devoid of any phase-compensating film stack;
   a third rear reflecting face;
   another phase-compensating film stack atop the third rear reflecting face, wherein said another phase-compensating film stack induces the $2n\pi$ phase difference in light upon reflection;
   wherein light enters and exits the cube corner retroreflector with substantially the same polarization orientation and substantially the same polarization ellipticity;
   wherein the phase-compensating film stack and said another phase-compensating stack each comprises:
     a first layer atop the corresponding reflecting face, the first layer comprising of titanium dioxide having an optical thickness of approximately 262.5 nm;
     a second layer atop the first layer, the second layer comprising silicon dioxide having an optical thickness of approximately 346.5 nm;
     a third layer atop the second layer, the third layer comprising titanium dioxide having an optical thickness of approximately 1018.5 nm;
     a fourth layer atop the third layer, the fourth layer comprises silicon dioxide having an optical thickness of approximately 462 nm; and a fifth layer atop the fourth layer, the fifth layer comprising titanium dioxide having an optical thickness of approximately 850.5 nm.

6. An optical system, comprising:

a polarizing beam-splitter that separates an input beam into at least one output beam having a specific polarization state; and a cube corner retroreflector comprising (a) an entrance/exit face devoid of any phase-compensating film stack and (b) at least two rear reflecting surfaces with phase-compensating film stacks, the phase-compensating film stacks each induces nπ phase difference in light upon reflection and n being any integer including 0;

wherein the output beam travels in a path comprising the cube corner retroreflector and the polarizing beam-splitter, and the output beam enters and exits the cube corner retroreflector with substantially the same polarization orientation and substantially the same polarization ellipticity.

7. The system of claim 6, wherein the cube corner retroreflector comprises a first rear reflecting surface and a third rear reflecting surface with the phase-compensating film stacks, and a second rear reflecting surface devoid of any phase-compensating film stack.

8. The system of claim 7, wherein the phase-compensating film stacks each comprises a stack of thin films wherein reflections from the thin films interfere to induce 2nπ phase difference where n is any integer including 0, and an interface between the last film in each phase-compensating film stack and air provides total internal reflection.

9. The system of claim 6, wherein the phase-compensating film stacks each comprises:

a first layer atop the corresponding reflecting face, the first layer comprising of silicon dioxide having an optical thickness of approximately 815 nm;

a second layer atop the first layer, the second layer comprising titanium dioxide having an optical thickness of approximately 1066 nm;

a third layer atop the second layer, the third layer comprising silicon dioxide having an optical thickness of approximately 1090 nm; and a fourth layer atop the third layer, the fourth layer comprises titanium dioxide having an optical thickness of approximately 1702 nm.

10. The system of claim 6, wherein the phase-compensating film stacks each comprises:

a first layer atop the corresponding reflecting face, the first layer comprising of titanium dioxide having an optical thickness of approximately 1316 nm;

a second layer atop the first layer, the second layer comprising silicon dioxide having an optical thickness of approximately 1279 nm; and a third layer atop the second layer, the third layer comprising titanium dioxide having an optical thickness of approximately 2595 nm.

11. The system of claim 6, wherein the phase-compensating film stacks each comprises;

a first layer atop the corresponding reflecting face, the first layer comprising of magnesium dioxide having an optical thickness of approximately 715 nm; and a second layer atop the first layer, the second layer comprising titanium dioxide having an optical thickness of approximately 1903 nm.

12. The system of claim 6, wherein the phase-compensating film stacks each comprises:

a first layer atop the corresponding reflecting face, the first layer comprising of titanium dioxide having an optical thickness of approximately 262.5 nm;

a second layer atop the first layer, the second layer comprising silicon dioxide having an optical thickness of approximately 346.5 nm;

a third layer atop the second layer, the third layer comprising titanium dioxide having an optical thickness of approximately 1018.5 nm;

a fourth layer atop the third layer, the fourth layer comprises silicon dioxide having an optical thickness of approximately 462 nm; and a fifth layer atop the fourth layer, the fifth layer comprising titanium dioxide having an optical thickness of approximately 850.5 nm.

13. An optical system, comprising:

a polarizing beam-splitter that separates an input beam into at least one output beam having a specific polarization state;

a quarter-wave plate devoid of any phase-compensating film stack;

a cube corner retroreflector comprising (a) an entrance/exit face devoid of any phase-compensating film stack and (b) three rear reflecting faces with phase-compensating film stacks, the phase-compensating film stacks each induces 2nπ phase difference in light upon reflection and n being any integer including 0;

wherein (a) the output beam travels in a path comprising the quarter-wave plate, the cube corner retroreflector, the quarter-wave plate, and the polarizing beam-splitter, and (b) the output beam enters and exits the cube corner retroreflector with substantially the same polarization orientation and substantially the same polarization ellipticity.

14. The system of claim 13, wherein an interface between the last film in each phase compensating film stack and air provides total internal reflection.

15. The system of claim 13, wherein the phase-compensating film stacks each comprises:

a first layer atop the corresponding reflecting face, the first layer comprising of silicon dioxide having an optical thickness of approximately 815 nm;

a second layer atop the first layer, the second layer comprising titanium dioxide having an optical thickness of approximately 1066 nm;

a third layer atop the second layer, the third layer comprising silicon dioxide having an optical thickness of approximately 1090 nm; and a fourth layer atop the third layer, the fourth layer comprises titanium dioxide having an optical thickness of approximately 1702 nm.

16. The system of claim 13, wherein the phase-compensating film stacks each comprises:

a first layer atop the corresponding reflecting face, the first layer comprising of magnesium dioxide having an optical thickness of approximately 715 nm; and a second layer atop the first layer, the second layer comprising titanium dioxide having an optical thickness of approximately 1903 nm.

17. The system of claim 13, wherein the phase-compensating film stacks each comprises:

a first layer atop the corresponding reflecting face, the first layer comprising of titanium dioxide having an optical thickness of approximately 262.5 nm;

a second layer atop the first layer, the second layer comprising silicon dioxide having an optical thickness of approximately 346.5 nm;

a third layer atop the second layer, the third layer comprising titanium dioxide having an optical thickness of approximately 1018.5 nm;

a fourth layer atop the third layer, the fourth layer comprises silicon dioxide having an optical thickness of approximately 462 nm; and a fifth layer atop the fourth layer, the fifth layer comprising titanium dioxide having an optical thickness of approximately 850.5 nm.

18. An interferometry system, comprising:

a polarizing beam-splitter that separates an input beam into a measurement beam having a first polarization and a reference beam having a second polarization;

a first quarter-wave plate devoid of any phase-compensating film stack;

a measurement mirror mounted to a moving component to be measured;

a cube corner retroreflector comprising (a) an entrance/exit face devoid of any phase-compensating film stack and (b) at least two rear reflecting surfaces with phase-compensating film stacks, the phase-compensating film stacks each inducing $n\pi$ phase difference in light upon reflection and n being any integer including 0;

wherein (a) the measurement beam travels in a measurement path comprising the first quarter-wave plate, the measurement mirror, the first quarter-wave plate, the polarizing beam-splitter, the cube corner retroreflector, the polarizing beam-splitter, the first quarter-wave plate, the measurement mirror, the first quarter-wave plate, and the polarizing beam-splitter, and (b) the measurement beam enters and exits the cube corner retroreflector with substantially the same polarization orientation and substantially the same polarization ellipticity, a second quarter-wave plate devoid of any phase-compensating film stack;

a reference mirror;

wherein (a) the reference beam travels in a reference path comprising the second quarter-wave plate, the reference mirror, the second quarter-wave plate, the polarizing beam-splitter, the cube corner retroreflector, the polarizing beam-splitter, the second quarter-wave plate, the reference mirror, the second quarter-wave plate, and the polarizing beam-splitter, and (b) the reference beam enters and exits the cube corner retroreflector with substantially the same polarization orientation and substantially the same polarization ellipticity.

19. An interferometry system, comprising:

a polarizing beam-splitter that separates an input beam into a measurement beam having a first polarization and a reference beam having a second polarization;

a first quarter-wave plate devoid of any phase-compensating film stack;

a first cube corner retroreflector mounted to a moving component to be measured, the first cube corner retroreflector comprising (a) an entrance/exit face devoid of any phase-compensating film stack and (b) three rear reflecting surfaces with phase-compensating film stacks, the phase-compensating film stacks in the first cube corner retroreflector each inducing $2n\pi$ phase difference in light upon reflection and n being any integer including 0;

a second cube corner retroreflector comprising (a) an entrance/exit face devoid of any phase-compensating film stack and (b) at least two rear reflecting surfaces with phase-compensating film stacks, the phase-compensating film stacks in the second cube corner retroreflector each inducing $n\pi$ phase difference in light upon reflection and n being any integer including 0;

wherein (a) the measurement beam travels in a measurement path comprising the first quarter-wave plate, the first cube corner retroreflector, the first quarter-wave plate, the polarizing beam-splitter, the second cube corner retroreflector, the polarizing beam-splitter, the first quarter-wave plate, the first cube corner retroreflector, the first quarter-wave plate, and the polarizing beam-splitter, and (b) the measurement beam enters and exits the first and the second cube corner retroreflectors with substantially the same polarization orientation and substantially the same polarization ellipticity;

a second quarter-wave plate devoid of any phase-compensating film stack;

a reference mirror;

wherein (a) the reference beam travels in a reference path comprising the second quarter-wave plate, the reference mirror, the second quarter-wave plate, the polarizing beam-splitter, the second cube corner retroreflector, the polarizing beam-splitter, the second quarter-wave plate, the reference mirror, the second quarter-wave plate, and the polarizing beam-splitter, and (b) the reference beam enters and exits the second cube corner retroreflector with substantially the same polarization orientation and substantially the same polarization ellipticity.

20. The system of claim 19, wherein an interface between the last film in each phase compensating film stack and air provides total internal reflection.

21. An interferometry system, comprising:

a polarizing beam-splitter that separates an input beam into a measurement beam having a first polarization and a reference beam having a second polarization;

a first quarter-wave plate devoid of any phase-compensating film stack;

a first cube corner retroreflector and a second cube corner retroreflector mounted to a movable component to be measured, the first and the second cube corner retroreflectors each comprising (a) an entrance/exit face devoid of any phase-compensating film stack and (b) three rear reflecting surfaces with phase-compensating film stacks, the phase-compensating film stacks in the first and the second cube corner retroreflectors each inducing $2n\pi$ phase difference in light upon reflection and n being any integer including 0;

a third cube corner retroreflector comprising (a) an entrance/exit face devoid of any phase-compensating film stack and (b) at least two rear reflecting surfaces with phase-compensating film stacks, the phase-compensating film stacks in the third cube corner retroreflector each inducing $n\pi$ phase difference in light upon reflection and n being any integer including 0;

wherein (a) the measurement beam travels in a measurement path comprising the first quarter-wave plate, the first cube corner retroreflector, the first quarter-wave plate, the polarizing beam-splitter, the third cube corner retroreflector, the polarizing beam-splitter, the first quarter-wave plate, the second cube corner retroreflector, the first quarter-wave plate, and the polarizing beam-splitter, and (b) the measurement beam enters and exits the first, the second, and the third cube corner retroreflectors with substantially the same polarization orientation and substantially the same polarization ellipticity,
a second quarter-wave plate devoid of any phase-compensating film stack;
a reference mirror;
wherein (a) the reference beam travels in a reference path comprising the second quarter-wave plate, the reference mirror, the second quarter-wave plate, the polarizing beam-splitter, the third corner retroreflector, the polarizing beam-splitter, the second quarter-wave plate, the reference mirror, the second quarter-wave plate, and the polarizing beam-splitter, and (b) the reference beam enters and exits the third cube corner retroreflector with substantially the same polarization orientation and substantially the same polarization ellipticity.

22. The system of claim 21, wherein an interface between the last film in each phase-compensating film stack and air provides total internal reflection.

23. An interferometry system, comprising:
a polarizing beam-splitter that separates an input beam into a measurement beam having a first polarization and a reference beam having a second polarization;
a first quarter-wave plate devoid of any phase-compensating film stack;
a measurement mirror mounted to a moving component to be measured;
a second quarter-wave plate devoid of any phase-compensating film stack;
a first cube corner retroreflector, a second cube corner retroreflector, and a third cube corner retroreflector each comprising (a) an entrance/exit face devoid of any phase-compensating film stack and (b) three rear reflecting surfaces with phase-compensating film stacks, the phase-compensating film stacks in the first and the third cube corner retroreflectors each inducing $n\pi$ phase difference in light upon reflection and n being any integer including 0, the phase-compensating film stacks in the second cube corner retroreflector each inducing $2n\pi$ phase difference in light upon reflection and n being any integer including 0;
wherein (a) the measurement beam travels in a measurement path comprising the first quarter-wave plate, the measurement mirror, the first quarter-wave plate, the polarizing beam-splitter, the first cube corner retroreflector, the polarizing beam-splitter, the first quarter-wave plate, the measurement mirror, the first quarter-wave plate, the polarizing beam-splitter, the second quarter-wave plate, the second cube corner retroreflector, the second quarter-wave plate, the polarizing beam-splitter, the third cube corner retroreflector, and the polarizing beam-splitter, and (b) the measurement beam enters and exits the first, the second, and the third cube corner retroreflectors with substantially the same polarization orientation and substantially the same polarization ellipticity;
a reference mirror;
wherein (a) the reference beam travels in a reference path comprising the third cube corner retroreflector, the polarizing beam-splitter, the second quarter-wave plate, the second cube corner retroreflector, the second quarter-wave plate, the polarizing beam-splitter, the first quarter-wave plate, the reference mirror, the first quarter-wave plate, the polarizing beam-splitter, the first cube corner retroreflector, the polarizing beam-splitter, the first quarter-wave plate, the reference minor, the first quarter-wave plate, and the polarizing beam-splitter, and (b) the reference beam enters and exits the first, the second and the third cube corner retroreflectors with substantially the same polarization orientation and substantially the same polarization ellipticity.

24. The system of claim 23, wherein an interface between the last film in each phase compensating film stack and air provides total internal reflection.

25. An interferometry system, comprising:
a polarizing beam-splitter that separates an input beam into a measurement beam having a first polarization and a reference beam having a second polarization;
a first quarter-wave plate devoid of any phase-compensating film stack;
a first cube corner retroreflector mounted to a moving component to be measured, the first cube corner retroreflector comprising (a) an entrance/exit face devoid of any phase-compensating film stack and (b) three rear reflecting surfaces with phase-compensating film stacks, the phase-compensating film stacks in the first cube corner retroreflector each inducing $2n\pi$ phase difference in light upon reflection and n being any integer including 0;
wherein (a) the measurement beam travels in a measurement path comprising the first quarter-wave plate, the first cube corner retroreflector, the first quarter-wave plate, and the polarizing beam-splitter and (b) the measurement beam enters and exits the first cube corner retroreflector with substantially the same polarization orientation and substantially the same polarization ellipticity;
a second quarter-wave plate devoid of any phase-compensating film stack; and
a second cube corner retroreflector comprising (a) an entrance/exit face devoid of any phase-compensating film stack and (b) three rear reflecting surfaces with phase-compensating film stacks, the phase-compensating film stacks in the second cube corner retroreflector each inducing $2n\pi$ phase difference in light upon reflection and n being any integer including 0;
wherein (a) the reference beam travels in a reference path comprising the second quarter-wave plate, the second cube corner retroreflector, the second quarter-wave plate, and the polarizing beam-splitter, and (b) the reference beam enters and exits the second cube corner retroreflector with substantially the same polarization orientation and substantially the same polarization ellipticity.

26. The system of claim 25, wherein an interface between the last film in each phase-compensating film stack and air provides total internal reflection.

27. An interferometry system, comprising:
a polarizing beam-splitter that separates an input beam into a measurement beam having a first polarization and a reference beam having a second polarization;
a first quarter-wave plate devoid of any phase-compensating film stack;
a measurement mirror mounted to a moving component to be measured;
a first cube corner retroreflector, comprising (a) an entrance/exit face devoid of any phase-compensating film stack and (b) three rear reflecting surfaces with phase-compensating film stacks, the phase-compensating film stacks in the first cube corner retroreflector each inducing $2n\pi$ phase difference in light upon reflection and n being any integer including 0;
a second cube corner retroreflector, comprising (a) an entrance/exit face devoid of any phase-compensating film stack and (b) at least two rear reflecting surfaces with phase-compensating film stacks, the phase-compensating film stacks in the second cube corner retroreflector each inducing $n\pi$ phase difference in light upon reflection and n being any integer including 0;

wherein (a) the measurement beam travels in a measurement path comprising the first quarter-wave plate, the measurement mirror, the first quarter-wave plate, the polarizing beam-splitter, the first cube corner retroreflector, the polarizing beam-splitter, the first quarter-wave plate, the measurement mirror, the first quarter-wave plate, the polarizing beam-splitter, the second cube corner retroreflector, the polarizing beam-splitter, the first quarter-wave plate, the measurement mirror, the first quarter-wave plate, the polarizing beam-splitter, the first cube corner retroreflector, the polarizing beam-splitter, the first quarter-wave plate, the measurement mirror, the first quarter-wave plate, and the polarizing beam-splitter, and (b) the measurement beam enters and exits the first and the second cube corner retroreflectors with substantially the same polarization orientation and substantially the same polarization ellipticity;

a second quarter-wave plate devoid of any phase-compensating film stack; and a reference mirror;

wherein (a) the reference beam travels in a reference path comprising the second quarter-wave plate, the reference mirror, the second quarter-wave plate, the polarizing beam-splitter, the first cube corner retroreflector, the polarizing beam-splitter, the second quarter-wave plate, the reference mirror, the second quarter-wave plate, the polarizing beam-splitter, the second cube corner retroreflector, the polarizing beam-splitter, the second quarter-wave plate, the reference mirror, the second quarter-wave plate, the polarizing beam-splitter, the first cube corner retroreflector, the polarizing beam-splitter, the second quarter-wave plate, the reference mirror, the second quarter-wave plate, and the polarizing beam-splitter, and (b) the reference beam enters and exits the first and the second cube corner retroreflectors with substantially the same polarization orientation and substantially the same polarization ellipticity.

28. The system of claim 27, wherein an interface between the last film in each phase-compensating film stack and air provides total internal reflection.

29. An interferometry system, comprising:

a polarizing beam-splitter that separates an input beam into a measurement beam having a first polarization and a reference beam having a second polarization;

a first cube corner retroreflector mounted to a moving component to be measured, the first cube corner retroreflector comprising (a) an entrance/exit face devoid of any phase-compensating film stack and (b) at least two rear reflecting surfaces with phase-compensating film stacks, the phase-compensating film stacks in the first cube corner retroreflector each inducing $n\pi$ phase difference in light upon reflection and n being any integer including 0;

wherein (a) the measurement beam travels in a measurement path comprising the first cube corner retroreflector and the polarizing beam-splitter, and (b) the measurement beam enters and exits the first cube corner retroreflector with substantially the same polarization orientation and substantially the same polarization ellipticity; and a second cube corner retroreflector comprising (a) an entrance/exit face devoid of any phase-compensating film stack and (b) at least two rear reflecting surfaces with phase-compensating film stacks, the phase-compensating film stacks in the second cube corner retroreflector each inducing $2n\pi$ phase difference in light upon reflection and n being any integer including 0;

wherein (a) the reference beam travels in a reference path comprising the second cube corner retroreflector and the polarizing beam-splitter, and (b) the reference beam enters and exits the second cube corner retroreflector with substantially the same polarization orientation and substantially the same polarization ellipticity.

30. The system of claim 13, wherein the phase-compensating film stacks each comprises:

a first layer atop the corresponding reflecting face, the first layer comprising of titanium dioxide having an optical thickness of approximately 1316 nm;

a second layer atop the first layer, the second layer comprising silicon dioxide having an optical thickness of approximately 1279 nm; and a third layer atop the second layer, the third layer comprising titanium dioxide having an optical thickness of approximately 2595 nm.

* * * * *

UNITED STATES PATENT AND TRADEMARK OFFICE
CERTIFICATE OF CORRECTION

PATENT NO. : 7,121,671 B2 Page 1 of 1
APPLICATION NO. : 10/734990
DATED : October 17, 2006
INVENTOR(S) : Lee et al.

It is certified that error appears in the above-identified patent and that said Letters Patent is hereby corrected as shown below:

Column 23, line 50, in Claim 3, delete "fact" and insert -- face --, therefor.

Column 23, line 62 (Approx.), in Claim 3, after "ellipticity" delete "," and insert -- ; --, therefor.

Column 24, line 38, in Claim 5, after "face" delete "," and insert -- ; --, therefor.

Column 25, line 61 (Approx.), in Claim 11, after "comprises" delete ";" and insert -- : --, therefor.

Column 27, line 37, in Claim 18, after "ellipticity" delete "," and insert -- ; --, therefor.

Column 28, line 10, in Claim 19, delete "die" and insert -- the --, therefor.

Column 29, line 66, in Claim 23, delete "minor" and insert -- mirror --, therefor.

Column 30, line 2, in Claim 23, after "second" insert -- , --.

Signed and Sealed this

Twentieth Day of February, 2007

JON W. DUDAS
*Director of the United States Patent and Trademark Office*